(12) United States Patent
Vold

(10) Patent No.: US 9,286,419 B2
(45) Date of Patent: *Mar. 15, 2016

(54) COMPUTER SIMULATION OF ELECTROMAGNETIC FIELDS

(71) Applicant: Terje Graham Vold, Anacortes, WA (US)

(72) Inventor: Terje Graham Vold, Anacortes, WA (US)

(73) Assignee: Terje Graham Vold, Anacortes, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,415

(22) Filed: Apr. 24, 2014

(65) Prior Publication Data

US 2014/0236551 A1    Aug. 21, 2014

Related U.S. Application Data

(63) Continuation-in-part of application No. 13/923,305, filed on Jun. 20, 2013, which is a continuation-in-part of application No. 13/914,507, filed on Jun. 10, 2013, now Pat. No. 8,849,627, which is a continuation-in-part of application No. 13/136,010, filed on Jul. 19, 2011, now Pat. No. 8,886,497, application No. 14/261,415, filed on Apr. 24, 2014, which is a continuation-in-part of application No. 13/914,507, which is a continuation-in-part of application No. 13/136,010, application No. 14/261,415, which is a continuation-in-part of application No. 13/136,010.

(60) Provisional application No. 61/365,366, filed on Jul. 19, 2010.

(51) Int. Cl.
*G06F 7/60* (2006.01)
*G06F 17/10* (2006.01)
*G06F 17/50* (2006.01)

(52) U.S. Cl.
CPC ........ *G06F 17/5009* (2013.01); *G06F 17/5018* (2013.01); *G06F 17/5036* (2013.01); *G06F 2217/16* (2013.01)

(58) Field of Classification Search
CPC ............ G06F 17/5018; G06F 17/5036; G06F 17/5009; G06F 2217/16; G05B 17/02
USPC ........................................................ 703/2
See application file for complete search history.

(56) References Cited

U.S. PATENT DOCUMENTS 6,516,292 B2   2/2003   Yahalom
8,849,627 B2   9/2014   Vold (Continued)

OTHER PUBLICATIONS

"Lagrangian Dynamics of Spinning Particles and Polarized Media in General Relativity" Ian Bailey, 1975.*

(Continued)

*Primary Examiner* — Saif Alhija
(74) *Attorney, Agent, or Firm* — David Lewis

(57) ABSTRACT

A method and system is provided for solving for electromagnetic fields by approximating an electromagnetic function as a sum of basis functions multiplied by coefficients to be determined. The set of equations used to determine the coefficients results from taking derivatives of the action integral with respect to the coefficients (and/or other parameters) and setting the derivative equal to zero, thereby extremizing the action integral.

45 Claims, 10 Drawing Sheets

(56) References Cited

U.S. PATENT DOCUMENTS 8,886,497 B1 11/2014 Vold
2013/0289955 A1 10/2013 Vold

OTHER PUBLICATIONS

Hestenes, D. (1966). "Space-Time Algebra." Gordon and Breach, Science Publishers, Inc. 93 Pages.
Harrington, Roger F. (1968). "Field Computation by Moment Methods." Robert E. Krieger Publishing Company, Inc.. 229 pages.
Jackson, John David. (1975). "Classical Electrodynamics." John Wiley & Sons Inc., 848 Pages.
Bailey, Ian et al. (1975). "Lagrangian Dynamics of Spinning Particles and Polarized Media in General Relativity." Commun. math Phys. 42, 65-82 Springer-Verlag.
Vold, Terje G. (1993). "An introduction to geometric calculus and with an application in rigid body mechanics." American Association of Physics Teachers American Journal of Physics, 61( 6), Jun. 1993. pp. 491-504.
Vold, Terje G. (1993). "An introduction to geometric calculus and its application to electrodynamics." American Association of Physics Teachers American Journal of Physics, 61( 6), Jun. 1993. pp. 505-513.
Jin, Jian-Ming. (2002). "The Finite Element Method in Electromagnetics." 2nd Edition, John Wiley & Sons Inc. 753 pages.
Gibson, Walton C. (2008). "The Method of Moments in Electromagnetics." Chapman & Hall / CRC. Taylor and Francis Group. 272 Pages.
Vold, Terje G. (Sep. 17, 2013) "Computing Electromagnetic Fields by the Method of Least Action." Advances in Applied Clifford Algebras. 2013, Springer Basel. DOI 10.1007/s00006-013-0417-1. 19 Pages.

* cited by examiner

COMPUTER SIMULATION OF ELECTROMAGNETIC FIELDS

CROSS-REFERENCE TO RELATED APPLICATIONS

This application is a continuation-in-part of U.S. patent application Ser. No. 13/923,305 entitled "Computer Simulation of Electromagnetic Fields", filed Jun. 20, 2013, submitted on behalf of inventor Terje Graham Vold, which is a continuation-in-part of U.S. patent application Ser. No. 13/914,507 entitled "Computer Simulation of Electromagnetic Fields," filed Jun. 10, 2013, submitted on behalf of inventor Terje Graham Vold, which is a continuation-in-part of U.S. patent application Ser. No. 13/136,010, entitled "Computer simulation of electromagnetic fields," filed Jul. 19, 2011, submitted on behalf of inventor Terje Graham Vold, which claims priority to U.S. Provisional Patent Application No. 61/365,366, entitled "Improved Computer Simulation of Electromagnetic Field," filed Jul. 19, 2010, by Terje Vold;

this application is also a continuation-in-part of U.S. patent application Ser. No. 13/914,507 entitled "Computer Simulation of Electromagnetic Fields," filed Jun. 10, 2013, submitted on behalf of inventor Terje Graham Vold, which is a continuation-in-part of U.S. patent application Ser. No. 13/136,010, entitled "Computer simulation of electromagnetic fields," filed Jul. 19, 2011, submitted on behalf of inventor Terje Graham Vold, which claims priority to United States Provisional Patent Application No. 61/365,366, entitled "Improved Computer Simulation of Electromagnetic Field," filed Jul. 19, 2010, by Terje Vold;

this application is also a continuation-in-part of U.S. patent application Ser. No. 13/136,010, entitled "Computer simulation of electromagnetic fields," filed Jul. 19, 2011, submitted on behalf of inventor Terje Graham Vold, which claims priority to U.S. Provisional Patent Application No. 61/365,366, entitled "Improved Computer Simulation of Electromagnetic Field," filed Jul. 19, 2010, by Terje Vold.

All of the above applications are each incorporated herein by reference.

FIELD

This specification generally relates to computations of electromagnetic fields.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. There are a variety of numerical techniques for computing numerical fields. Boundary element methods are often used in electromagnetic simulations. The general idea of boundary element methods is that space is modeled as consisting of regions with uniform electromagnetic response properties separated by negligibly thin boundaries. For each uniform region, a parameterized solution to Maxwell's equations is written (for example, a sum of parameters times plane waves, or a sum of parameters times fields due to fictitious "equivalent sources"). The parameterization and the parameters are chosen so that the error is small in some sense.

However, the best method for minimizing the errors is not at all obvious. A common method is the "method of moments." However, the method of moments is rather poorly motivated and ad-hoc. Different choices of parameters are chosen for different notions of "error" and "small" for different situations. In other words, the choice of parameterization and parameters is an art form that depends on the user's intuition.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1, 2, 5-11 is a brief description of each element, which may have no more than the name of each of the elements in the one of FIGS. 1, 2, 5-11 that is being discussed. After the brief description of each element, each element is further discussed in numerical order. In general, each of FIGS. 1-11 is discussed in numerical order and the elements within FIGS. 1-11 are also usually discussed in numerical order to facilitate easily locating the discussion of a particular element. Nonetheless, there is no one location where all of the information of any element of FIGS. 1-11 is necessarily located. Unique information about any particular element or any other aspect of any of FIGS. 1-11 may be found in, or implied by, any part of the specification.

System

Figure 1:
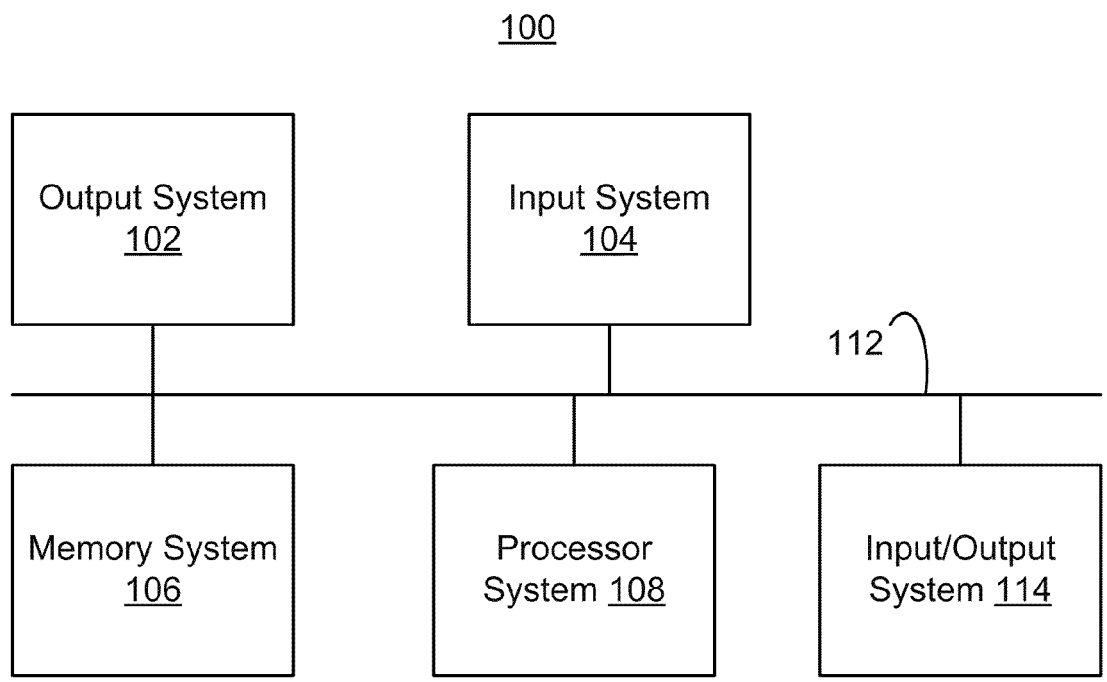
FIG. 1 shows a block diagram of a machine that may be used for carrying out the computations for determining electromagnetic fields.

FIG. 1 shows a block diagram of a machine 100 that may be used for carrying out the computations for determining electromagnetic fields. Machine 100 may include output system 102, input system 104, memory system 106, processor system 108, communications system 112, and input/output device 114. In other embodiments, machine 100 may include additional components and/or may not include all of the components listed above.

Machine 100 is an example of what may be used for carrying out the computations for determining electromagnetic fields. Machine 100 may be a computer and/or a special purpose machine computing electromagnetic computations.

Output system 102 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. Output system 102 may be used to display indication the types of input needed, whether there are any issues with the inputs received, and output results of a computation of an electromagnetic field, for example.

Input system 104 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example. Input system 104 may be used to enter the problem parameters, such as the grid on which to perform the computations, the material parameters of each region within the grid, choose basis functions, and initial state, if applicable.

Memory system 106 may include, for example, any one of, some of, any combination of, or all of a long term storage system, such as a hard drive; a short term storage system, such as random access memory; a removable storage system, such as a floppy drive or a removable drive; and/or flash memory. Memory system 106 may include one or more machine-readable mediums that may store a variety of different types of information. The term machine-readable medium is used to refer to any non-transient medium capable carrying information that is readable by a machine. One example of a machine-readable medium is a computer-readable medium. Memory system 106 may store the machine instructions (e.g., a computer program, which may be referred to as a code) that cause machine 100 to compute electromagnetic field computations. Memory 106 may also store material parameters corresponding to specific materials and basis-functions. The basis function may be parameterized solutions to the electromagnetic equations within a homogenous region.

Processor system 108 may include any one of, some of, any combination of, or all of multiple parallel processors, a single processor, a system of processors having one or more central processors and/or one or more specialized processors dedicated to specific tasks. Processor system 110 may carry out the machine instructions stored in memory system 108, and compute the electromagnetic field.

Communications system 112 communicatively links output system 102, input system 104, memory system 106, processor system 108, and/or input/output system 114 to each other. Communications system 112 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 114 may include devices that have the dual function as input and output devices. For example, input/output system 114 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 114 is optional, and may be used in addition to or in place of output system 102 and/or input device 104.

Figure 2:
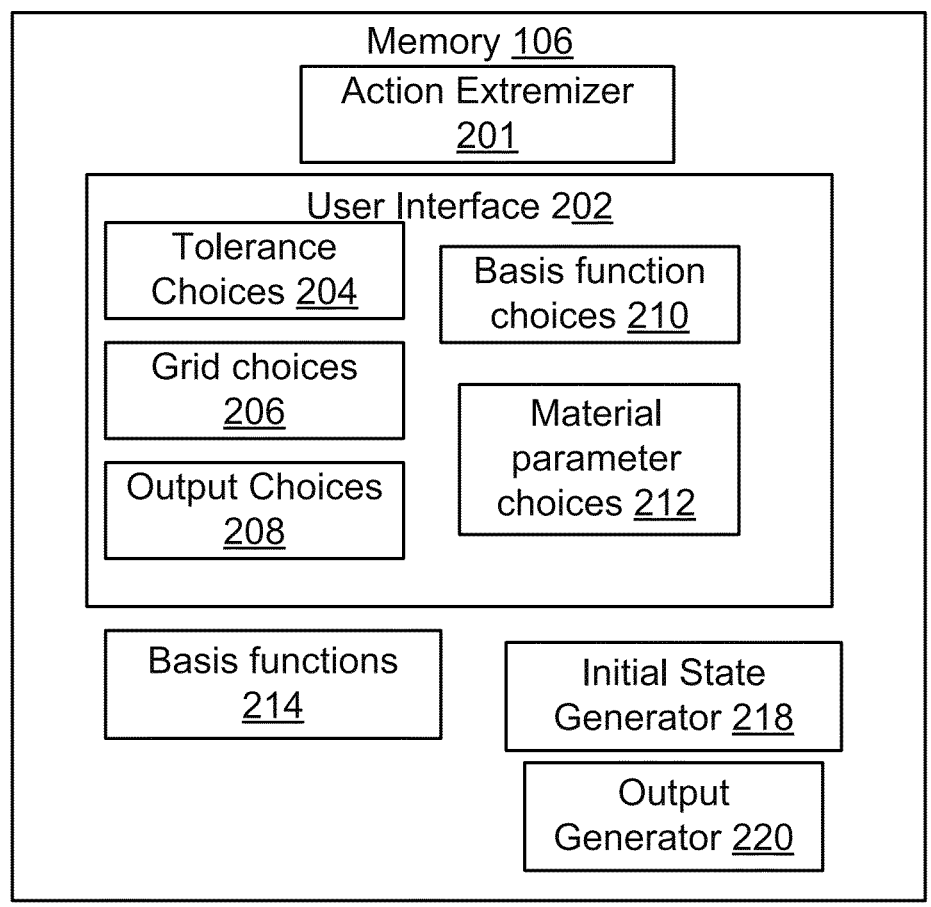
FIG. 2 is a block diagram of an example of system, which may store the machine code for solving for electromagnetic fields.

FIG. 2 is a block diagram of an example of system 200, which may store the machine code for solving for electromagnetic fields. System 200 may include action extremizer 201 and user interface 202 having tolerance choices 204, grid choices 206, output choices 208, basis function choices 210, and material parameter choices 212. Memory 106 may also include basis functions 214, initial state generator 218, and output generator 220. In other embodiments, system 200 may include additional components and/or may not include all of the components listed above.

In an embodiment, system 200 is an embodiment of memory system 106, and the blocks of system 200 represent different functions of the code that solves for electromagnetic fields performs, which may be different modules, units and/or portions of the code. Alternatively, system 200 may be a portion of the processor system, such as an Application Specific Integrated Circuit (ASIC), and/or another piece of hardware in which the code of system 200 is hardwired into system 100.

Notation

The notation of Doran and Lasenby in Geometric Algebra for Physicists (Cambridge University Press, 2003) in SI units is used in the current specification. For reference, some details of the notation of Doran and Lasenby are given in the notation section.

A frame vector of 4D space-time is represented by $\gamma_a$ for $\alpha \in \{0,1,2,3\}$, with $\gamma_0$ equal to the time-like frame vector and with $\gamma_0\gamma_0=1$, and $\gamma_i\gamma_i=-1$ for $i\in\{1,2,3\}$, and $\gamma_\alpha\gamma_\beta=0$ for $\alpha\neq\beta$. A reciprocal frame vector of 4D space-time is represented by $\gamma^\alpha$ for $\alpha \in \{0,1,2,3\}$, with $\gamma^\alpha\gamma_\alpha=+1$ for $\alpha\in\{0,1,2,3\}$ and $\gamma^\alpha\gamma_\alpha=0$ for $\alpha\neq\beta$. A frame vector of the 3D space of the inertial frame associated with $\gamma_0$ is represented by $\vec{e}_i=\gamma_i\gamma_0$ for $i\in\{1,2,3\}$. The electromagnetic field F is defined to equal the antisymmetric part of the space-time vector derivative of the space-time vector potential A, $$F = \nabla \wedge A,$$

where the space-time vector derivative is related to the time and vector derivative in 3D space by $$\nabla = \left(\frac{1}{c}\frac{\partial}{\partial t} - \vec{\nabla}\right)\gamma_0$$

the space-time potential A is related to the scalar potential P and vector potential A in 3D space by $$A = \left(\varepsilon_0 \Phi + \frac{1}{c\mu_0} \vec{A}\right)\gamma_0$$

∧ is the outer product of geometric algebra, $\gamma_0$ is the time-like space-time velocity vector defining the inertial frame associated with the 3D space vector potential $\vec{A}$ and scalar potential $\Phi$, and quantities with an over-script arrow such as $\vec{A}$ are always vectors in the 3D space of the inertial frame defined by $\gamma_0$. In this specification, the word "potential" is generic to the space-time vector potential, to the scalar and vector potential in 3D space together or separately, to the "media potential"

$$A_m = \left(\varepsilon\Phi + \frac{1}{\nu\mu}\vec{A}\right)\gamma_0,$$

and/or to other simply related quantities including a discontinuous potential that is related to a continuous potential by a gauge transformation.

The electromagnetic field F is related to the electric field $\vec{E}$ and "magnetic B-field" or "magnetic intensity" $\vec{B}$ by $$F = \varepsilon_0 \vec{E} + \frac{1}{c\mu_0} III \vec{B}$$

where $$III \equiv \vec{e}_1 \vec{e}_2 \vec{e}_3 = \gamma_0 \gamma_1 \gamma_2 \gamma_3$$

is the pseudoscalar of the geometric algebra of both 3D space and 4D space-time. The 3D cross product is related to the wedge product via the pseudoscalar by III $\vec{a} \times \vec{b} = \vec{a} \wedge \vec{b}$. In general, the field G is a function of F and a polarization field P, or G=f(F,P). Although the methods described herein are not limited to linearly polarizable material, for linearly polarizable media the field G is the sum of F and a polarization field P, $$G = F + P,$$

where the 4D space-time polarization field P is composed of the 3D space vector electric polarization $\vec{P}$ and magnetic polarization vector $\vec{M}$ according to $$P = \vec{P} - III \frac{1}{c} \vec{M}$$

so that G may be written as $$G = \vec{D} + III \frac{1}{c} \vec{H},$$

where the electric displacement field g is given by $$\vec{D} = \varepsilon_0 \vec{E} + \vec{P},$$

and the "magnetic H-field" or "magnetic field" $\vec{H}$ is given by $$\vec{H} = \frac{1}{\mu_0} \vec{B} - \vec{M}.$$

In this specification, the word "field" is generic to F or G, or their parts E, B, D, or H, or the simply related media field $F_m$.

The polarizations $\vec{P}$ and $\vec{M}$ are generally modeled as functions of $\vec{E}$ and $\vec{B}$, often linear functions, but not necessarily. The space-time vector field J representing charge-current density in 4D space-time volumes is related to the charge density ρ and 3D vector current density $\vec{J}$ by the equation $$J = \left(\rho + \frac{1}{c}\vec{J}\right)\gamma_0$$

and the space-time vector field K representing charge-current density on 3D boundaries in 4D space-time is related by the equation $$K = \left(\sigma + \frac{1}{c}\vec{K}\right)\gamma_0$$

The convention of Mathematica from Wolfram Research that expressions are grouped by rounded brackets (parentheses) while function arguments are enclosed by square brackets [like these] is used. Function arguments may be implied or written explicitly, so that, for example, the action may be written as either S or S[A,∇A].

Extremizer 201 extremizes the action integral by adjusting coefficients of a sum of basis. After the coefficients have been adjusted by the extremizer, the sum of basis functions is a solution or an approximation of a solution to the electromagnetic fields. User interface 202 may be used for receiving input for setting up the problem to solve and outputting results of computing electromagnetic fields. Tolerance choice 204 is an input for entering the tolerance for performing the computations or another form of input for determining the accuracy with which to perform the computations.

Grid choices 206 includes one or more input fields for defining the space in which the problem is solved, including a description of boundaries between regions with different polarizabilities. Grid choices 206 may also include input fields for defining the initial state of the system. The grid choices 206 divide the computation region into two or more smaller computation regions or cells.

In an embodiment, a grid may be chosen to divide space or space-time into computation regions that are simplices, or to divide the boundary between regions into simplices. In the current specification, a simplex (which in plural form is simplexes or simplices) refers to a generalization of the notion of a triangle or tetrahedron to arbitrary dimension. Specifically, an n-simplex is an n-dimensional molope, which is the convex hull of n+1 vertices. For example, a 2-simplex is a triangle, a 3-simplex is a tetrahedron, and a 4-simplex is a pentachoron. Simplices may be desirable when the parameterized potential is defined to be a linear function of position within each simplex. Using simplices, a continuous potential may be parameterized by the values of the continuous potential at all simplex vertices, and the field F is a constant within each simplex because the field F is defined to be a linear combination of derivatives of A. Also, the field G is a constant within each simplex if the field G is a function of only the field F, whether G is a linear or nonlinear function of F. Simplices may be defined that cover all of the simulation space, or may be combined with regions of other or arbitrary shape. Including simplices with or between regions of arbitrary shape may make it easier to define good potential basis functions.

An example of a situation where it may be convenient to have some regions that are simplices and some that are not is to cover a region containing a nonlinear material with simplices, and to use a single space-time region for a homogenous linearly polarizable medium outside the nonlinear material. In this example, the boundary between the nonlinear and linearly polarizable media is represented by lower dimensional simplices.

Basis functions 210 may include a set of default basis functions that the user can choose, such as those specified by boundary values and calculated with the help of Green's theorem as an integral of the boundaries of each simplex. Basis functions 210 may also include an input charge-current source or associated basis field. Basis function choices 210 may include a list of default basis functions, which the user may choose. In an embodiment, the default basis functions, when multiplied by a series of quantities (which may be referred to as parameters) and summed together, may form parameterized functions, and solving for the parameters solves the electromagnetic equations. The basis functions 210 may include potential basis functions and field basis functions. In this specification, the term basis function is generic to potential basis functions, field basis functions, and other basis functions.

In an embodiment, each potential basis function may be specified by potential values on boundaries along with the requirement that at non-boundary points the Euler-Lagrange equation is satisfied by the potential for any set of parameter values.

In another embodiment, each potential basis function may be specified by values of the scalar potential and tangential values of the vector potential on boundaries and the requirement that the potential satisfies the Lorenz condition at region points next to a boundary, along with the requirement that at non-boundary points the potential satisfies the wave equation in the media for any set of parameter values.

Basis functions may be defined in terms of fields that would result from fictitious "virtual" charge and current densities, such as point dipole moments, in a corresponding fictitious space filled with an unbounded uniform polarizable medium. In one embodiment, one or more virtual point dipole moments at each of a series of points are used to define each basis function within each region with uniform polarizability. The positions, directions, and type (electric and/or magnetic) of the virtual dipole moments may be chosen to form a good set of basis functions. A good set of basis functions is a set basis functions capable of representing any function that may represent the electromagnetic fields in the non-boundary regions. In an embodiment a good set of basis functions is a complete set of basis functions. In an embodiment, the virtual dipole moments and/or other virtual charge and current densities are located outside of a computation cell and/or region in which the basis function is being defined.

Material parameters 212 may include the material parameters that the user can choose for each region of the space in which the problem is being solved, for example. In an embodiment, material parameters may include combinations of material parameters associated with common materials, so that the user can just specify the name of the material and the combination of parameters associated with that material may be assigned to the region chosen.

Basis function 214 may include an algorithm for choosing basis functions when the user has not chosen and/or may include an algorithm for converting the user's input into a function that is called by the code as the basis functions that are used by least action extremizer 201 to extremize the action integral and solve for the fields.

An Embodiment

Action extremizer 201 is a module that solves for the electromagnetic fields by extremizing the action. In general, action extremizer 201 computes numerical values for a set of parameters of basis functions (e.g., the vector and scalar potentials from which the electric and magnetic fields may be derived). In an embodiment, the potential functions are a parameterized continuous electromagnetic potential. The values of the parameters are computed within a predetermined tolerance to extremize an action integral. The action integral is the integral of the Lagrangian density. The Lagrangian density contains terms for the electromagnetic field in vacuum or in polarizable media and for the interaction of the electromagnetic field with electric charge and current. The terms of the electromagnetic fields may describe linear or nonlinear polarizable media.

A method is described for accurately and efficiently computing values of electromagnetic fields, suitable for use in various fields of applied physics and engineering ranging from magnetostatics to RF engineering to integrated optics. An electromagnetic potential is defined that is parameterized by the electromagnetic potential's tangential components at boundaries between regions with uniform polarizability, and parameter values are chosen that extremize the classical electromagnetic action. Useful general results are derived using the geometric algebra of space-time. The method is compared with the widely used method of moments.

The Principle of Least Action

The current section contains a summary of the principle of least action as applied to electromagnetism in space-time, using the notation of and results from [1,2], and SI units. For simplicity the problem is restricted to linearly polarizable media. The electromagnetic action S with a space-time vector charge-current source density J is a scalar-valued functional $S[A, \nabla A]$ of a continuous space-time vector field A and derivatives $\nabla A$ of A, over all of space-time volume u, given by the integral $$S = \int_u \left(\frac{1}{2} F \cdot F - A \cdot J\right) du \quad (1)$$

where the electromagnetic field F is a space-time bivector field defined as a derivative of the space-time potential A, a space-time vector field, by $$F \equiv \hat{\nabla} A \quad (2)$$

The total source $J \equiv J_f + J_b$ is the sum of a "free" source density $J_f$ and a "bound" source density $J_b \equiv \nabla \cdot P$ where $$P = P - \left(\frac{1}{c}\right)IM$$

is the electric vector plus magnetic bivector polarization. For simplicity, P is assumed to be a linear function of F. However, taking P to be a linear function of F is not necessary and G may be a nonlinear function of F in this case. A·J can be integrated by parts to rewrite the action as $$S = \int_u \left(\frac{1}{2} F \cdot G - A \cdot J_f\right) du \quad (3)$$

where the displacement-magnetic field G≡F+P is a linear function of F since P is. In the simple case of isotropic polarizability, the equation for the displacement-magnetic field G can be written as $$G[F] \equiv \left(\frac{\varepsilon}{\varepsilon_0}\right) F \cdot \gamma_0 \gamma_0 + \left(\frac{\mu_0}{\mu}\right) F \wedge \gamma_0 \gamma_0 \quad (4)$$

where the permittivity $\in$ and permeability μ are scalar functions of position in the rest frame of the medium, associated with the unit time-like vector $\gamma_0$. The principle of least action says that variation δS of the action S with respect to any variation δA of the field A must equal zero for any physically realizable field A:

$$\delta \int_u \left(\frac{1}{2} F \cdot G - A \cdot J_f\right) du = 0 \quad (5)$$

After writing F in terms of A and using linear dependence of G on F, the first term of equation (5) can be integrated by parts so that equation (5) can be written as $$\int_u \delta A \cdot (\nabla \cdot G - J_f) du = 0 \quad (6)$$

Equation (6) is true if and only if the Euler-Lagrange equation, $$\nabla \cdot G - J_f = 0 \quad (7)$$

holds throughout space-time u.

F and therefore G do not depend on $\nabla \cdot A$, resulting in a gauge freedom. The gauge freedom may be removed by requiring that A satisfies the Lorenz condition, $$\nabla \cdot A = 0 \quad (8)$$

Maxwell's Equations

The following section contains a summary of the expression of the Euler-Lagrange equations using vectors and scalars in 3D space.

The space-time bivector field F may be projected into two parts, one part containing and one part not containing a unit time-like vector $\gamma_0$ associated with any particular inertial reference frame, as $$F = \vec{F} \gamma_0 \gamma_0 + \hat{F} \gamma_0 \gamma_0 \quad (9)$$

The first term of equation (9) is a 3D space vector proportional to the electric field $\vec{E}$ and the second is a 3D space bivector proportional to the magnetic intensity $\vec{B}$. Using SI units, the first term of equation (9) is $$F = \varepsilon_0 \vec{E} + \left(\frac{1}{c}\right)\left(\frac{1}{\mu_0}\right) I \vec{B} \quad (10)$$

where $\in_0$ and $\mu_0$ are constants, $c = 1/\sqrt{\in_0 \mu_0}$ and I is the unit pseudoscalar. Following the convention [1,2], an arrow over the letter is used to represent only 3D vectors.

Similarly, the space-time bivector field G may be expressed as the sum of parts projected onto and rejected by $\gamma_0$, $$G = \vec{G} \gamma_0 \gamma_0 + \hat{G} \gamma_0 \gamma_0$$

the two terms of equation (11) give the displacement $\vec{D} \equiv \in_0 \vec{E} + \vec{P} = \in E$ and magnetic field $$\vec{H} \equiv \frac{1}{\mu_0} \vec{B} - \vec{M} = \frac{1}{\mu} \vec{B}$$

according to $$G = \vec{D} + \left(\frac{1}{c}\right) I \vec{H} \quad (12)$$

The scalar and space-time bivector parts of the product of the Euler-Lagrange equation with $\gamma_0$ give the first and second of Maxwell's equations, $$\nabla \cdot \vec{D} = \rho_f \quad (13)$$

$$\nabla \times \vec{H} - \frac{\partial \vec{D}}{\partial t} = \vec{J}_f \quad (14)$$

The space-time bivector and pseudoscalar parts of the product of the mathematical identity $\vec{\nabla} \vec{\nabla} A = 0$ with $\gamma_0$ give the third and fourth of Maxwell's equations, $$\nabla \times \vec{E} + \frac{\partial \vec{B}}{\partial t} = 0 \quad (15)$$

$$\nabla \cdot \vec{B} = 0 \quad (16)$$

Discontinuities in Polarizability

Discontinuities in polarizability of the medium with change in position in space correspond to discontinuities in permittivity $\in$ or permeability μ. Although the space-time potential A is continuous everywhere by assumption, discontinuity in polarizability generally corresponds to discontinuities in derivatives of A and therefore in F and in G. If space-time is filled with bounded regions of 4D volume having continuous polarizability with discontinuities only at the boundaries between the bounded regions, then such discontinuities in F and G occur only at the boundary points. Let the collection of boundary points be called β and the collection of region points be called u and let the corresponding surface charge-current density and spatial charge-current density be called $K_f$ and $J_f$, respectively. Then the equation from which the Euler-Lagrange equation was deduced can, in the instant case, be written as $$\int_u \delta A \cdot (\nabla \cdot G - J_f) du + \int_\beta \delta A \cdot (n \cdot \Delta G - K_f) d\beta = 0 \quad (17)$$

for any variation $\delta A$, where n is a unit normal space-time vector at the boundary, $\Delta G$ is the change in G across such a boundary in the direction n, and du and $d\beta$ are scalar-valued integration differentials. The integration differential du is an infinitesimal volume in u and the integration differential $d\beta$ is an infinitesimal area on the boundary surface $\beta$ separating regions of space-time volume u with continuous polarizability.

The Method of Least Action

In the general theoretical framework above, any variation $\delta A$ in the field A is considered. But in numerical computations, typically the field A is parameterized with a finite number of parameters $c_\alpha$ that may range over all possible values or may be constrained to range over some specified set of values.

For simplicity, consider A to be a linear function of parameters $c_\alpha$, $$A = a_\alpha c_\alpha \quad (18)$$

where the $a_\alpha$ are basis fields for the field A, the subscripted index ranges over a set of integers, and use the convention of summing over repeated dummy indices. Each basis field $a_\alpha$ is defined and continuous at every point of space-time, including boundary points. Some parameters may be known or specified, corresponding to "known" or "incident" fields, and others unknown; for simplicity, let the parameters $c_\alpha$ for $\alpha \neq 0$ be unknown and that for $\alpha = 0$ be known, and choose $c_0 = 1$. The convention that a Greek index such as $\alpha$ ranges over all values while a Roman index such as i ranges over $i \neq 0$ is used herein.

Substituting $A = a_\alpha c_\alpha$, then extremize the action with respect to variations of A that are described by variations $\delta c_j$ of the parameters $c_j$, that is, $$\delta A = \left(\frac{\partial A}{\partial c_j}\right) \delta c_j = a_j \delta c_j.$$

The result is true for any set of values of the variations $\delta c_i$ including $\delta c_j = \delta_{i,j}$ where $\delta_{i,j}$ is the Dirac delta function, for which equation (17) above becomes the set of equations indexed by i, $$\int_u a_i \cdot (\nabla \cdot G - J_f) du + \int_\beta a_i \cdot (n \cdot \Delta G - K_f) d\beta = 0 \quad (19)$$

Equation (19) is a general result that may be applied by the method of least action to compute electromagnetic fields. Specifically, equation (19) applies to both linear and nonlinear media, although for simplicity the discussion is continued below for linear media.

Since F is a linear function of A and G is a linear function of F, F and G can each be written as corresponding sums of basis functions, $$F = f_\alpha c_\alpha \quad (20)$$

where $f_\alpha = \hat{\nabla} a_\alpha$, and $$G = g_\alpha c_\alpha \quad (21)$$

where $$g_\alpha = \frac{\varepsilon}{\varepsilon_0} f_\alpha \cdot \gamma_0 \gamma_0 + \frac{\mu_0}{\mu} f_\alpha \wedge \gamma_0 \gamma_0.$$

Consequently, the integral function above, the set of equations (19), can be written in terms of the basis functions $f_\alpha$, and $g_\alpha$, as $$\int_u a_i \cdot (\nabla \cdot g_\alpha c_\alpha - J_f) du + \int_\beta a_i \cdot (n \cdot \Delta g_\alpha c_\alpha K_f) d\beta = 0 \quad (22)$$

It is convenient to put all terms containing unknown parameters ($\alpha = j \neq 0$) on the left, and all others (including $\alpha = 0$ terms) on the right; the result can be written explicitly as a matrix equation, $$m_{i,j} c_j = b_i \quad (23)$$

where $$m_{i,j} = \int_u a_i \cdot (\nabla \cdot g_j) du + \int_\beta a_i \cdot (n \cdot \Delta g_j) d\beta \quad (24)$$

and $$b_i = -\int_u a_i \cdot (\nabla \cdot g_0 - J_f) du - \int_\beta a_i \cdot (n \cdot \Delta g_0 - K_f) d\beta \quad (25)$$

The preceding system of equations, equations (23), (24) and (25), can be solved for the parameters $c_j$, and then using the value $m_{i,j}$ and $b_i$, the value of any field at any point can be calculated.

The solving of equations (23), (24) and (25) is especially useful when combined with the use of "media potentials" (which are potential functions that are dependent on the media parameters) in polarizable media and the use of potentials that are discontinuous across the boundaries between regions containing material with different polarizabilities, as will be described in later sections, and when the basis functions are chosen so that the volume integrals are zero for any set of parameter values. Despite the simplicity of solving equations (23), (24) and (25), solving equations (23), (24) and (25) has not been previously used in computational electromagnetism.

Since solving equation (19) or equations (23), (24) and (25) to compute electromagnetic fields is based on the principle of least action, in this specification the solution method is referred to as the method of least action.

Vector Algebra Expression

Each space-time vector quantity w is related to a relative scalar $w_0$ and relative 3D space vector $\vec{w}$ in a frame associated with the unit time-like vector $\gamma_0$ by $$w = w \gamma_0 \gamma_0 = (w \cdot \gamma_0 + w \wedge \gamma_0) \gamma_0 = (w_0 + \vec{w}) \gamma_0$$

For the space-time vector position r, boundary normal n, basis potential $a_i$, free charge-current volume density $J_f$, free charge-current boundary density $K_f$, and derivative $\nabla$, the corresponding scalar and 3D vector quantities are related by $$r = (ct + \vec{r}) \gamma_0 \quad (26)$$

$$n = (n \cdot \gamma_0 + \vec{n}) \gamma_0$$

$$a_i = \left(\varepsilon_0 \Phi_i + \left(\frac{1}{c}\right)\left(\frac{1}{\mu_0}\right) \vec{a}_i\right) \gamma_0$$

$$J_f = \left(\rho_f + \frac{1}{c} \vec{J}_f\right) \gamma_0$$

$$K_f = \left(\sigma_f + \frac{1}{c} \vec{K}_f\right) \gamma_0$$

-continued $$\vec{\nabla} = \gamma_0\left(\left(\frac{1}{c}\right)\partial_t + \vec{\nabla}\right)$$

The expressions for r, n, $a_i$, $J_f$, $K_f$, and $\nabla$ can be used to rewrite the matrix and array elements above in terms of scalar and 3D vector quantities. In simple cases such that all media at non-boundary volume points V and boundary points s in 3D space are stationary in one inertial reference frame, $n \cdot \gamma_0 = 0$ at all boundary points and these elements may be rewritten as $$m_{i,j} = \int_t \int_V (\phi_i(\vec{\nabla} \cdot \vec{d}_j) - \vec{a}_i \cdot (\vec{\nabla} \times \vec{h}_j - \partial_t \vec{d}_j)) dV dt + \int_t \int_s (\phi_i(\vec{n} \cdot \Delta \vec{d}_j) - \vec{a}_i \cdot (\vec{n} \times \vec{h}_j)) ds dt \quad (27)$$

and $$b_i \equiv -\int_t \int_V (\phi_i(\vec{\nabla} \cdot \vec{d}_0 - \rho_f) - \vec{a}_i \cdot (\vec{\nabla} \times \vec{h}_0 - \partial_t \vec{d}_0 - J_f)) dV dt - \int_t \int_s (\phi_i \cdot (\vec{n} \cdot \Delta \vec{d}_0 - \sigma_f) - \vec{a}_i \cdot (\vec{n} \times \vec{h}_0 - K_f)) ds dt \quad (28)$$

Harmonic Time Dependence

If all medium boundaries are stationary in one inertial frame associated with $\gamma_0$, the time coordinate can be defined as $$t = \left(\frac{1}{c}\right) r \cdot \gamma_0$$

and the 3D space position vector as $\vec{r} = \hat{r} \gamma_0$ at any point r of space-time; if in addition all time dependence is harmonic, such as for one Fourier component after applying a Fourier transform, the complex vector representation of fields with an implied factor of $e^{-i\omega t}$ may be applied. In the instant case the general expressions for the matrix and array elements for frequency $\omega$ are identical to those of (26) and (27), but with $\partial_t$ replaced by $-i\omega$ and integration done over only the volume V and boundary s, and not time t.

The formulation of the general expression for the matrix and array elements allows simulation of electrical conductivity by using complex-valued permittivity E. Since such a permittivity has frequency dependence of $$\frac{1}{\omega}$$

for small frequencies $\omega$, multiplying every row in the matrix equation (22) containing a factor of such a permittivity by the frequency $\omega$ and canceling these factors symbolically before numerical calculation of the matrix elements results in a set of equations that can then be solved without any numerical problems for any frequency, including $\omega=0$. Other diverging factors such as $$\frac{1}{\omega - \omega_0},$$

representing a physical resonance with numerical problems at frequency $\omega_0$, can be similarly eliminated.

Parameterized Potential Satisfying the Euler-Lagrange Equation

It is convenient to choose $A = a_\alpha c_\alpha$ to satisfy the Euler-Lagrange equation $\nabla \cdot G = J_f$ where $G = g_\alpha c_\alpha$, with $g_\alpha = g[\hat{\nabla} a_\alpha]$, for any set of unknown parameters $c_i$ at all non-boundary points. The equation $\nabla \cdot G = J_f$ (where $G = g_\alpha c_\alpha$, with $g_\alpha = g[\hat{\nabla} a_\alpha]$) will be satisfied for any set of unknown parameters $c_i$ if the basis potential functions satisfy $$\nabla \cdot g_0 = J_f$$

$$\nabla \cdot g_i = 0 \quad (29)$$

at all non-boundary points. In the instant case the volume integrals in the matrix elements given by (24) and (25), or equivalently by (27) and (28), are all identically zero.

Choosing A to satisfy the Euler-Lagrange equation can generally be done if space is modeled as made up of homogeneous polarizable regions. If space is modeled as made up of homogeneous polarizable regions, each potential basis function $a_\alpha$ may be defined by specifying the value of potential basis function $a_\alpha$ at all points on boundaries between homogeneous regions, and by defining the function within each homogenous region to satisfy the corresponding Euler-Lagrange equation while having specified boundary values. For homogeneously polarizable regions, computationally practical expressions for such basis functions can be found as described later.

The Euler-Lagrange Equation in Polarizable Media and Media Quantities

The following section on the Euler-Lagrange Equation in Polarizable Media describes a method for easily solving the Euler-Lagrange equation in regions with uniform polarizability, by introducing a "media potential" with components that are linear transformations of the potential components and that satisfy the wave equation. Introducing a "media potential" allows symbolic expression and fast numerical computations of basis functions that satisfy the Euler-Lagrange equation at non-boundary points.

The fundamental physical space-time vector operator $\nabla$ and vector quantities A and J, when expressed as relative quantities in an inertial frame characterized by $\gamma_0$, for example, $A = A \gamma_0 \gamma_0 = (A \cdot \gamma_0 + \hat{A} \gamma_0) \gamma_0$, are related to associated scalar and 3D vector quantities in SI units by $$\vec{\nabla} = \gamma_0 \left(\left(\frac{1}{c}\right)\partial_t + \vec{\nabla}\right) \quad (30)$$

$$A = \left(\varepsilon_0 \phi + \left(\frac{1}{c}\right)\left(\frac{1}{\mu_0}\right)\vec{A}\right)\gamma_0 \quad (31)$$

$$J_f = \left(\rho_f + \left(\frac{1}{c}\right)\vec{J}_f\right)\gamma_0 \quad (32)$$

where the quantity $J_f$ represents all "free" electric charge source $\rho_f$ and electric current source $J_f$ defined as any source that is not described by derivatives of the electric polarization $\vec{P}$ or magnetic polarization $\vec{M}$ of the medium. $J_f$ is related to the total charge-current source J by $J = J_f + J_b$, where $$\left(J_b = \rho_b + \left(\frac{1}{c}\right)\vec{J}_b\right)\gamma_0$$

is the "bound" source, defined as source that is described by the derivatives $\rho_b = -\vec{\nabla} \cdot \vec{P}$ and $J_b = \vec{\nabla} \times \vec{M} - \partial_t \vec{P}$ of the electric polarization $\vec{P}$ and magnetic polarization $\vec{M}$ of the medium, or equivalently by $J_b \equiv \nabla \cdot P$ where $$P \equiv \vec{P} - \left(\frac{1}{c}\right) I \vec{M}$$

Note that since $J_f$ is defined as any source that is not described by derivatives of the electric polarization $\vec{P}$ or magnetic polarization $\vec{M}$ of the medium, the induced charge $\rho_b$ and current source $\vec{J}_b$ in an electrical conductor, described by a complex permittivity, is a "bound" source $J_b$, not a "free source" $J_f$. Consequently, in this specification, the charged current source $J_f$ may be referred to as the "specified" source instead of "free" source to avoid confusion.

Next, the "media" quantities are defined for media at rest in an inertial frame represented by $\gamma_0$ by replacing $\in_0 \to \in$ and $\mu_0 \to \mu$ everywhere $\in_0$ and $\mu_0$ would otherwise occur in the equations for free space, including in $c = 1/\sqrt{\in_0 \mu_0}$, where $\in_0$ and $\mu_0$ are the permittivity and permeability of free space, respectively, while $\in$ and $\mu$ are the corresponding parameters of a particular media. Thus, the media vector derivative, media potential, and media charge-current are given in terms of components of the corresponding non-media quantities by $$\nabla_m \equiv \gamma_0 \left( \left(\frac{1}{v}\right) \partial_t + \vec{\nabla} \right) \tag{33}$$

$$A_m = \left( \varepsilon \phi + \left(\frac{1}{v}\right)\left(\frac{1}{\mu}\right) \vec{A} \right) \gamma_0 \tag{34}$$

$$J_m = \left( \rho_f + \left(\frac{1}{v}\right) \vec{J}_f \right) \gamma_0 \tag{35}$$

where $v = 1/\sqrt{\in \mu}$, which is the speed of a light in a media having the material parameters $\in$ and $\mu$, while the speed of light in a vacuum is given by $c = 1/\sqrt{\in_0 \mu_0}$. When computing the harmonic time dependence at frequency $\omega$, and using complex amplitudes, $\partial_t$ is replaced by $-i\omega$ and $k \equiv \omega/c$ in $\nabla$ is replaced by $k_m = \omega/v$ to form $\nabla_m$.

The Euler-Lagrange equation may be rewritten in terms of these quantities as $$\nabla_m \cdot G_m = J_m \tag{36}$$

where $$G_m \equiv \nabla_m \wedge A_m = \varepsilon_0 \vec{E} + \left(\frac{1}{v}\right)\left(\frac{1}{\mu}\right) I \vec{B} \tag{37}$$

The wedge product of any space-time vector quantity, including $\nabla_m$, with itself is still zero, and consequently, $$\nabla_m \wedge G_m = 0, \tag{38}$$

which may be combined with the rewritten Euler-Lagrange equation as $$\nabla_m G_m = J_m \tag{39}$$

It is useful to require that $A_m$ satisfies the "media Lorenz condition,"

$$\nabla_m \cdot A_m = 0 \tag{40}$$

Although the "media Lorenz condition" is not equivalent to the Lorenz condition—the media Lorenz condition may be written as $$\left(\frac{1}{v^2}\right) \partial_t \phi + \vec{\nabla} \cdot \vec{A} = 0$$

while the Lorenz condition, $\nabla \cdot A = 0$, may be written as $$\left(\frac{1}{c^2}\right) \partial_t \phi + \vec{\nabla} \cdot \vec{A} = 0$$

—either are equally valid gauges to which the electromagnetic equations may be constrained to remove the gauge invariance, thereby simplifying solving the electromagnetic equations numerically. Using the media Lorenz condition, the Euler-Lagrange equation simplifies to the wave equation $$\nabla_m^2 A_m = J_m \tag{41}$$

With the expressions of equations (37), (38), (39), (40), and (41), solutions to the Euler-Lagrange equation can be found in linearly polarizable media by transforming any boundary conditions on the potential A to boundary conditions on the media potential $A_m$ and any specified source $J_f$ to a media source $J_m$, solving the media wave equation for $A_m$, and then transforming the solution from $A_m$ back to A.

Basis Functions Defined by Boundary Values

A useful method of defining a space-time potential in a bounded region, such as a potential basis function $a_\alpha$, is to 1) identify the space-time vector value $a_\alpha$ of the space time potential and the space-time vector value of the normal derivative $n \cdot \nabla a_\alpha$ of the space time potential, representing 8 degrees of freedom, on the region side of all boundary points, 2) require that, within the region, the potential satisfies the Euler-Lagrange equation, 3) require that within the region the potential also satisfies a gauge condition, and 4) use the gauge condition and Green's Theorem on the side of each of the boundary points that is within the region (in which the current computation is being performed), as constraints to reduce the number of degrees of freedom at each boundary point from 8 to 3. It may be convenient to choose the 3 remaining degrees of freedom to be the components of the potential that are tangential to the boundary in space-time. Specifically, the 4 space-time components of the potential at every boundary point plus the 4 space-time components of the normal derivative of the potential at every boundary point gives 8 degrees of freedom. Next, Greens Theorem is applied, which gives 4 equations (or 4 degrees of constraint) for every boundary point that relates all 8 of the degrees of freedom reducing the number of degrees of freedom to 4. The Lorenz condition provides one more equation (or 1 more degree of constraint), which relates only derivatives and further reduces the number of degrees of freedom to 3. One may choose values for any 3 of the 8 quantities (e.g., based on boundary conditions), and compute the remaining 5 quantities from the 3 chosen quantities.

It can be convenient to compute the potential from the boundary values using the corresponding medium potential, medium vector derivative, and other corresponding quantities such as the medium gauge condition and medium Euler-Lagrange equation. It may be convenient to choose the 3 degrees of freedom to be the tangential components of the potential function.

The 3 chosen degrees of freedom (e.g., the tangential components of the potential function) at each boundary point can be given by a finite number of parameters in a model of the potential, from which all 8 degrees of freedom of the potential and its normal derivative, and therefore the fields $f_\alpha$ and $g_\alpha$, can be quickly calculated at all points on the boundary. The potential and field value at any point in the region may then be calculated from the values on the boundary using Greens Theorem [3].

Basis functions defined by the values on the boundary are easy to define and calculate if every point of space is either part of a region with uniform polarizability, or on the boundary between such regions. Then within each region, a medium-Lorenz condition may be chosen such that the medium potential satisfies the medium wave equation, for which Green's function and theorem are simple and numerically tractable.

The boundary between regions may be modeled or approximated as a set of connected triangles, with the potential specified at each vertex by 3 parameters and defined to vary linearly with position at all other points on each triangle.

Each such basis function may be chosen to have nonzero tangential boundary components on only one localized part of the boundary, such as by choosing the parameters of the basis function to be nonzero at only one vertex. Choosing nonzero tangential boundary components on only one localized part of the boundary results in the integrands of the boundary integrals of (19) being zero everywhere except in the localized part of the boundary having the nonzero tangential boundary components, since the integrand is independent of the perpendicular component of the potential. The computation time required to compute the value of each integral from previously computed potential and field values is then linear in the size of the problem (e.g., the number V of triangle vertices).

The application of Greens theorem to define the basis potentials, however, requires the computation of order $p^2$ matrix elements and inversion of the resulting p by p matrix, where p is the number of vertex points. The matrix mi,j of equations (7,9,11) is also is of order p by p and also must be inverted. The time required to solve electromagnetic problems by the application of Green's theorem method of least action may be dominated by these two computations.

This method results in good basis functions for a wide variety of geometries, including thick or thin wires and thick or thin sheets, with any electric and magnetic polarizability and any electric conductivity.

Stress Tensor Conservation Laws

Noether's theorem depends on the satisfying the Euler-Lagrange equations that follow from Hamilton's principle of least action (briefly, Noether's theorem states that any differentiable symmetry of the action of a physical system—e.g., a smooth transformation that does not affect the action—has a corresponding conservation law). Solutions using the method of least action that satisfy $\nabla \cdot G - J_f = 0$ at all non-boundary points and $\int_\beta a_i \cdot (n \cdot \Delta G - K_f) d\beta = 0$ for all basis functions $a_i$, satisfy a modified Noether's theorem that gives a modified conservation law for the electromagnetic stress-energy tensor T, where matrix elements of T are given by $T_{\mu\nu} = F \gamma_\mu F \gamma_\nu$. $T_{\mu\nu}$ represents the flux through a hyperplane perpendicular to $\gamma_\mu$ of the v component of the energy-momentum density.

Noether's Theorem applied to the invariance of the electromagnetic action with respect to the symmetry of translation in time is $\nabla \cdot T = 0$ at every point of space-time. From $\nabla \cdot T = 0$ it follows that $n \cdot \Delta T = 0$ at every point of any physical or mathematical surface with normal vector n where $\Delta T$ is the change in T across the surface. The equation $n \cdot \Delta T = 0$ represents the conservation of energy-momentum through the surface at the point being considered. The modified Noether's theorem is $\nabla \cdot T = 0$ at all non-boundary points, and $\int_\beta a_i \cdot (n \cdot \Delta T) d\beta$ for all basis functions $a_i$. $\nabla \cdot T = 0$ describes the conservation of energy and momentum at all non-boundary points, and $\int_\beta a_i \cdot (n \cdot \Delta T) d\beta$ describes a potential-weighted boundary integral conservation law for energy and momentum at boundary points. For localized basis functions, as described in the section "An embodiment of the method of basis functions defined by boundary values," $\int_\beta a_i \cdot (n \cdot \Delta T) d\beta$ ensures that the integral or average of energy momentum over a small patch identified by the localized basis function $a_i$—but not at every infinitesimal point—is exactly conserved across the boundaries between regions of computation.

Gauge-Equivalent Potentials

Discontinuity of the potential across boundaries appears to violate an initial assumption of the principle of least action, that the potential is a continuous function at all points.

However, it can be shown that given any potential A' that satisfies the Euler-Lagrange equation and the media Lorenz condition, and is continuous across the boundaries except for the perpendicular component of the potential A', the potential $A = A' - \nabla \lambda$ satisfies the Euler-Lagrange equation, is continuous at all points including boundary points, and results in the same field $\hat{\nabla} A = \hat{\nabla} A'$, where $\lambda$ is any continuous scalar field such that at the boundaries, $\lambda = 0$ and $n \cdot (A' - \nabla \lambda)$ is continuous, where n is the boundary normal. The resulting potential A generally cannot satisfy the Lorenz condition $0 = \nabla \cdot A$ or media Lorenz condition, since doing so requires that $\lambda$ satisfies a $2^{nd}$ order differential equation, $\nabla \cdot A' = \nabla^2 \lambda$ for the Lorenz condition, and the necessary boundary conditions over-determine a solution to such an equation. A and A' have the same tangential boundary values, result in the same field F, and differ by only a gauge transformation; we may say such potentials are "gauge-equivalent".

An Embodiment of the Method of Basis Functions Defined by Boundary Values

The current section discusses the calculation of potentials and fields at boundary points. Specifically, the current section describes a method for calculating all components of the potential, and calculating the normal directional derivative of the potential at all boundary points enclosing a region with uniform polarizability, given the boundary conditions of only the tangential components of the potential. The electromagnetic field at all boundary points can then be calculated from the components of the potential and the normal directional derivative of the potential, which allows evaluation of the boundary integrals needed to extremize the action.

The first step is to specify the value of each basis potential $a_\alpha$ and the normal derivative of the basis potential $a_\alpha$ at boundary points by a) requiring that each basis potential $a_\alpha$ satisfies the corresponding homogenous or inhomogeneous Euler-Lagrange equation and the media Lorenz condition, and therefore the media wave equation, at all points enclosed by the given boundary, b) giving the values of each basis potential $a_\alpha$ tangential components at all boundary points, and c) using the media Lorenz condition and Greens Theorem for the media wave equation as constraints to calculate the basis potential normal component and all components of the normal derivative of the basis potential at boundary points. For a choice of basis potentials, that meet requirements (a), (b), and (c), the volume integrals in the equation expressing extremization of the action are all identically zero, and the coefficients $c_i$ can be varied in the total potential $A = a_\alpha c_\alpha$ to extremize the boundary integrals of the action.

To evaluate the boundary integrals needed to extremize the action, the values of each electromagnetic field basis function $g_\alpha$ must be found on each side of every boundary at every boundary point. The method described in the current section enables the efficient calculation of the normal component of a space-time vector potential a and the normal directional derivatives of all components of a at all boundary points, given the tangential components of a, for a potential that satisfies the Euler-Lagrange equation and the Lorenz condition such as any one of the basis potentials $a_\alpha$. The value of any field basis function $g_\alpha$ can be calculated from the boundary values and normal derivatives of the potential basis function $a_\alpha$. A useful method of defining the value and normal derivative of each space-time basis potential function $a_\alpha$ on the boundary of a region may be to require that within the region in which the computation is being performed that the potential satisfies $\nabla \cdot g_\alpha - \delta_{0,\alpha} J_f = 0$ (where $\delta_{0,\alpha}=1$ when $\alpha=0$ and $\delta_{0,\alpha}=0$ for all other values of $\alpha$). The potential function a and the potential function's normal derivatives at all boundary points are defined in terms of a finite number of variables. The potential a may represent, for example, any one of the basis functions $a_\alpha$. The following simple model illustrates the method, although the same method can be used to define smoother albeit more complex models, or less smooth models.

First, a general curved boundary is approximated by connected boundary simplices. For a 2D boundary in 3D space (applicable to cases in which time-varying fields are represented by Fourier components in frequency space, for example), the boundary simplexes are triangles and it is useful to visualize the instant case as representative. The unit vector normal to the surface of the simplex s, may be written as $n_s$. At each vertex v, a unit vector $n_s$ is specified, which may be normal to the physical boundary that is being approximated by the connected simplices, which may be defined as the normalized sum of the area vectors of the simplices that share that vertex. The resulting potential solution depends only weakly on the choice of normal vectors $n_v$, so the exact definition is not critical.

At each vertex v, we define the potential parameters to be the value of the space-time vector potential $a_v \equiv a[r_v]$ which have 4 degrees of freedom, and the derivative in the direction $n_v$ of the components of a that are perpendicular to $n_v$, which are $\partial_v a_{vv} \equiv (n_v \cdot \nabla)(n_v \hat{n}_v a[r_v])$, and which have 3 degrees of freedom. The derivative in the direction $n$, of the component of a that is parallel to $n_v$ is determined from the values of a on the boundary by the medium Lorenz condition. At any one vertex, this derivative in the direction $n_v$ of the component of a that is parallel to $n_v$ is generally different for each triangle that shares that vertex. All 4 components of the potential and all 4 components of the normal derivative of the potential at all points on the boundary are in expressed in terms of only 7 parameters at each vertex. The tangential components of the potential are continuous across any boundary, and so have the same values as the boundary is approached from either side, but the normal component of the potential and all components of the directional derivative of the potential are generally different on the two sides of a boundary between media with different polarizabilities; each side must be treated independently.

The potential a at any point on a boundary simplex is defined to be the linear function of position on that simplex that matches the vertex values $a_v$. Recall that the media potential $a_m$ is just equal to a linear transformation of the components of a at each point, so it is possible to use either the function a or $a_m$ as the potential (the form of the resulting equations are unchanged) and transform from one to the other as needed.

Now, as a result of defining the potential a to be the linear function of position on that simplex that matches the vertex values $a_v$, one can derive expressions for the potential a and for the normal derivative $(n_s \cdot \nabla)a$ of the potential at every boundary simplex point on both sides of the boundary, in terms of potential parameters that have 7 degrees of freedom per vertex. 7 degrees of freedom is too many degrees for the boundary conditions of a space-time vector function that satisfies a wave equation in the region enclosed by the boundary, making the potential in this region over-constrained. Green's theorem is applied to eliminate 4 of the 7 degrees of freedom in the parameters $a_v$ (with 4 degrees) and $n_v \cdot \nabla n_v \hat{n}_v a_v$, (with 3 degrees) at each vertex v, as follows.

For simplicity, consider only the important practical case of a space composed of stationary bounded regions of uniform polarizability. For convenience, the computation is performed in the 3D algebra of an inertial frame of the boundaries. Assume harmonic time dependence, as is the case for Fourier components, and parameterize the potential by the potential's complex valued components on boundaries. Given such a basis potential a on the boundary of a region V, the potential's value a at any point in the region enclosed by the boundary $s = \partial V$ of V or on the boundary s, such as a vertex point $r_v$, is related to the potential value a and normal derivative $\nabla_n a$ of the potential on the entire boundary by Green Theorem, $$a[\vec{r}_v] = \int_{s=\partial V}(\psi[\vec{r}-\vec{r}_v]\nabla_n a[\vec{r}] - \nabla_n \psi[\vec{r}-\vec{r}_v]a[\vec{r}])\,ds + \int_V j_f[\vec{r}]\psi[\vec{r}-\vec{r}_v]dV \quad (42)$$

where $\nabla_n = \vec{n} \cdot \vec{\nabla}$ and a suitable Green's function for the potential a is $$\psi[\vec{r}] = \frac{1}{4\pi|\vec{r}|}e^{ik|\vec{r}|} \quad (43)$$

Equations (42) and (43) apply if the medium's polarizability is zero. If the medium's polarizability is not zero, then a similar expression but with a, $j_f$, $\vec{\nabla}$, and k replaced by the media quantities $a_m$, $j_m$, $\vec{\nabla}_m$, $k_m$, as described earlier, is used.

Writing one equation for each boundary simplex vertex v of the simulation with p vertex points, the potential $a[\vec{r}_v]$ on the left hand side equals a the potential value at the position $\vec{r}_v$ of vertex v, and the potential $a[\vec{r}]$ and the normal derivative $\nabla_n a[\vec{r}]$ of the potential in the integrals is a linear function of the potential parameters $a_v$ and $\partial_v a_{vv}$ on each triangle of the boundary. Consequently, equations (42) and (43) express linear relationships between the potential parameter $a_v$ for one particular vertex on the left, and all potential parameters, $a_v$ and $\partial_v a_{vv} = n_v \cdot \nabla n_v \hat{n}_v a[\vec{r}_v]$, for all vertices on the right.

These p space-time vector equations make 4p scalar equations of constraint (where p is the number of vertex points). These constraints can be used to write all 7p parameters as linear functions of the 3p parameters $n_v \hat{n}_v a_v$ (i.e., the components of the potential a that are perpendicular to the vertex normal vector $n_v$) at any boundary vertex v. The Lorenz or media Lorenz condition can then be applied at any boundary point to also calculate the 8th degree of freedom (the normal derivative of the normal component of the potential) at any boundary point.

Each basis function $a_i$ is chosen to be described by setting one component of the vertex parameter $n_v \hat{n}_v a_v$ at one vertex equal to unity, and all other vertex parameters and the source $j_f$ to zero. The basis function $a_0$ may be chosen to be described by setting the 3p vertex parameters at each vertex to equal zero but setting the source $j_i$ to equal the specified source $J_f$, or $J_m$ if using media quantities, of the simulation. There are then 3p basis functions $a_i$ and associated coefficients $c_i$, one corresponding to each of the 3p parameters $n_v, \hat{n}_v, a_v$.

Quantities can be numerically evaluated to obtain a 7p×3p matrix for each region, giving the 4p components of the potential $A = a_\alpha c_\alpha$ and the 3p normal derivatives of the potential components perpendicular to $n_v$ at the p vertices as linear functions of the 3p basis function coefficients $c_i$ and of position on each boundary triangle. The normal derivative of the potential component perpendicular to the simplex at any point on any boundary simplex can be numerically evaluated from these values.

From the resulting expressions, expressions for the field F as a linear function of the 3p parameters $n_v, \hat{n}_v, a_v$ and for the field G as a linear function of F are written on both sides of every boundary point. The next step is to numerically evaluate the boundary integrals needed to find the coefficients $c_i$ that extremize the action, and numerically solve for the coefficients $c_i$.

With a choice of basis functions described by the vertex parameters and within the approximation of using simplices to represent the physical boundary, each integral needed to extremize the action has a non-zero integrand over only a localized region of the boundary for which the tangential components of the corresponding basis function are non-zero. These integrals using localized basis potentials can be much faster to compute than integrals using non-localized basis potentials.

Calculation of Potentials and Fields at Non-Boundary Points

Given the values of a potential A and the potential's normal derivatives at all boundary points—such as either a basis potential or the potential that extremizes the action—the potential $A[\vec{r}]$ and the fields $F = \vec{\nabla} A$ and $G[F]$ can be calculated at any point $\vec{r}$ using Green's theorem as applied to A and to G, using the media quantities $A_m$ and $G_m$ for example.

To find the potential A in a region with zero polarizability, Green's theorem expression from the previous section can be used with the final potential solution A in place of a.

To find the field F in a region with zero polarizability, Green's theorem expression (which is more accurately referred to as Green's third identity) for Maxwell's equation can be used, $$F[\vec{r}'] = \int_{s=\partial V} \Psi[\vec{r} - \vec{r}'] \vec{n} F[r] ds - \int V \Psi[\vec{r} - \vec{r}'] \gamma_0 j[\vec{r}] dV \quad (44)$$

where an appropriate Green's function is $$\psi[\vec{r}] = (-ik + \vec{\nabla}) \phi[\vec{r}]$$

where $$k \equiv \frac{\omega}{c}.$$

Alternatively, F can be numerically calculated from values of A at nearby points.

For a region with non-zero polarizability (including complex electric polarizability, representing electrical conductivity), the same expressions, but with the media quantities $G_m$, $k_m$, and $j_m$ in place of F, k, and j, are used.

Additional Constraints

Each potential and field may be parameterized as a sum of parameters $c_i$ times corresponding basis functions. The method of least action identifies parameter values that extremize the action.

For example the charge $Q = \int_V \rho dV = 0$ in a 3D volume V may be rewritten using the Euler-Lagrange equation $\nabla \cdot G = J$ dotted with $\gamma_0$, or $\vec{\nabla} \cdot \vec{D} = \rho$, to give $\int_V \vec{\nabla} \cdot \vec{D} dV = Q$. Applying the divergence theorem gives $s = \partial V \vec{n} \cdot \vec{D} ds = Q$. If the charge is known—typically Q=0 for non-zero frequencies when using complex amplitudes of Fourier expansions—then this equation is a linear constraint on the basis coefficients $c_i$ via $\vec{D}$.

The action may be extremized subject to a constraint equation such as the preceding example by Lagrange's method. Such constraints may be enforced by defining an auxiliary action function S' given by $$S' = S + \lambda \int_{s=\partial V} \vec{n} \cdot \vec{D} ds \quad (46)$$

where $\lambda$ is a Lagrange multiplier in the current example, and then finding parameters $c_i$ and $\lambda$ that simultaneously satisfy the variational equations $\delta_{c_i} S' = 0$ and the constraint equation $\int_{s=\partial V} \vec{n} \cdot \vec{D} ds = Q$.

Doing so may improve numerical performance even if not required for solution. For example, numerical errors may result in a very small but nonzero effective variation in the net charge and an associated longitudinal electric field wave, and these errors may be smaller using such a constraint.

Calculating Potential Values Using Virtual Sources

The phrase "physical source" is used to refer to any charge-current source that exists in the situation being simulated, and the phrase "virtual source" is used to refer to any charge-current source that does not exist in the situation being simulated, but rather is a mathematical artifice used to help calculate potentials and fields in analogy with virtual images in electrostatics. Virtual sources on boundaries are often called equivalent sources in computational electromagnetism literature.

Virtual sources may be used to define a basis potential $a_i$ within any one particular region R. The basic idea is that a fictitious infinite space with uniform polarizability is considered, with fictitious virtual charge-current source $j_i^R$ in addition to any physical charge-current $j_i$ (take $j_i = J$ for i=0 and $j_i = 0$ otherwise), from which the potential that satisfies the Euler-Lagrange equation and the associated field F is calculated. The virtual charge-current source $j_i^R$ is chosen to be nonzero only at points not in region R. That is, the virtual charge-current source $j_i^R$ is located at points on the boundary or outside of the region. The potential may be chosen to satisfy the wave equation and the Lorenz condition. The virtual charge-current source is parameterized, and the parameters are chosen so that the resulting potential meets the boundary conditions (e.g., the specified scalar potential and tangential vector potential values on the boundary) within an acceptable error. Parameterizing the virtual charge-current source results in an expression for the basis potential $a_i$ at any point $\vec{r}$ in region R that is an acceptably good approximation, within region R, for the original problem involving a space with boundaries between regions of uniform polarizability. Every region is parameterized, and then the parameterization process is repeated for every basis potential.

Although the basis potential $a_i$ is calculated using the idea of a fictitious space and a virtual source, $a_i$ satisfies the Euler-Lagrange equation in the region R and satisfies the boundary condition regardless of the existence of any real source. Consequently, the basis potential $a_i$ is also an acceptable potential function for the original problem even though in that problem there is or may be different polarizability and sources outside of region R. The result is that for each basis potential, for each region with uniform polarizability, there are virtual sources located outside the region (plus the physical source for i=0, located in the region, in an embodiment) from which the potential for that basis function in that region can be calculated.

If the virtual sources are well chosen, the resulting potential can satisfy the boundary conditions to a good approximation and satisfy the wave equation and the Lorenz condition exactly. For example, the virtual source for each basis potential and each region may be a collection of point electric and magnetic dipoles with well-chosen locations, and with parameterized amplitudes chosen to satisfy the boundary conditions within a good approximation. Then, both the potential and the electromagnetic field associated with a given virtual source can be quickly calculated using simple well-known expressions for the potential and field due to dipoles.

By choosing a large enough set of parameters and corresponding virtual sources, the basis potential $a_i$ can be chosen to yield the correct field to an approximation that is as good as desired. Note that the parameters of the basis potential are chosen for each basis potential $a_i$ for each region R to make $a_i$ acceptably continuous across all boundaries in the problem, and are subsequently treated as constants; the parameters chosen to approximate each basis potential $a_i$ are not the parameters $c_i$ of the parameterized potential $A=\Sigma_i c_i a_i$ that are determined by extremizing the action.

A useful measure of error in meeting the boundary conditions is the integral over the boundary of $|(\Delta A \hat{\ } n)\gamma_0|^2$, where $\Delta A$ is the difference between the space-time potential defined by virtual sources and the specified boundary values, and n is a unit space-time vector field normal to the boundary. Parameters describing the virtual sources for any basis function in any region can be chosen to minimize the measure of error found from the integral over the boundary of $|(\Delta A \hat{\ } n)\gamma_0|^2$.

Calculating Potential Values as Approximate Solutions to the Euler-Lagrange Equation Continuous basis functions that exactly or approximately satisfy the Euler-Lagrange equation at non-boundary points and have specified values at boundary points, or that satisfy the wave equation at non-boundary points and the Lorenz condition and have specified Lorenz-gauge-equivalent boundary values, may be defined in various ways.

For example, if a region is very thin compared with the radius of curvature of the region, such as a matching region, or if the wavelength in the region is small compared with the radius of curvature of the boundary of the region, such as a piece of formed sheet metal, it may be possible to quickly identify simple acceptable approximate expressions for the potentials and fields. For example, in the case of the region very thin compared with the radius of curvature of the region, the potential may be chosen as the product of the potential value on the boundary times a function of the perpendicular distance from the boundary chosen so that the resulting potential approximately or exactly satisfies the Euler-Lagrange equation. The function of the perpendicular distance might, for example, be found as or approximated by a power series, an exponential function, or the product of a power series and exponential function.

In a polarizable medium, the medium potential $A_m$ is generally used and transforms to the potential A after finding a desired solution. Computing $A_m$ can be a useful method, because the differential equation for $A_m$ is simple. Assuming for simplicity that there is no specified charge or current $J_m$ inside the region of interest, the differential equation for $A_m$ is $$\nabla_m^2 A_m = 0.$$

In any particular orthonormal coordinate system {x,y,z}, the equation for $A_m$ becomes $$\left(\frac{1}{v_m^2}\partial_t^2 - \partial_x^2 - \partial_y^2 - \partial_z^2\right)A_m = 0.$$

The preceding equation for $A_m$ might be used, for example, if a region is very thin compared with the radius of curvature of the region. For simplicity, choose z to be perpendicular to the boundary in the region of interest. It might be assumed that no quantities, including $A_m$, change quickly tangentially to the boundary, so that the x and y derivatives may be neglected. Then the above equation for $A_m$ may be approximated as, $$\left(\frac{1}{v_m^2}\partial_t^2 - \partial_z^2\right)A_m \approx 0$$

If there are quantities that vary harmonically with time and if the harmonically varying quantities of time are represented with complex fields, the above equation may be replaced by $$\left(-\frac{\omega^2}{v_m^2} - \partial_z^2\right)A_m \approx 0$$

or $$(k_m^2 + \partial_z^2)A_m \approx 0,$$

where $k_m = |\omega|/v_m$ is the medium wavenumber. The solution to the preceding equation may be written as an exponential function with a generally complex argument. Other approximations and solutions may also be used. For example, the region may contain a boundary of discontinuity in polarizability, in which case the potential approximation may be continuous but piecewise linear across the discontinuity.

From expressions for $A_m$, the potential A may be computed, and then the fields F and then G may be computed on the boundary of the region. Assuming the potential A and field G have already been determined on the other side of the boundary, the change $\Delta G$ in the field G across the boundary can be calculated. Using the calculation of $\Delta G$, the boundary integrals required for extremizing the action may also be calculated.

Method

Figure 3:
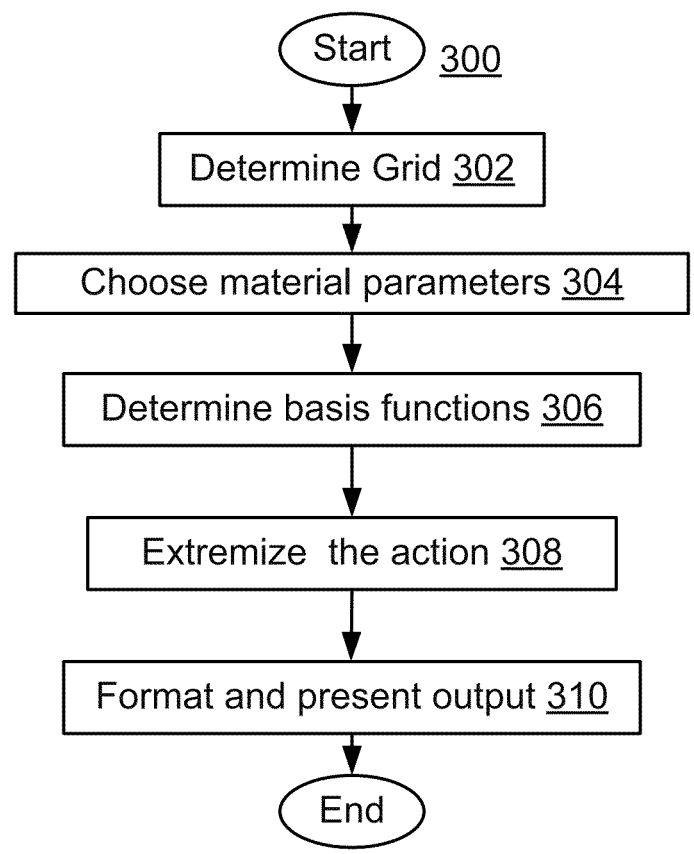
FIG. 3 is a flowchart of an embodiment of a method that is implemented by processor system.

FIG. 3 is a flowchart of an embodiment of a method 300 that is implemented by processor system 300. In step 302, a determination is made of how to set up the grid, such as the size of the different regions of the problem area. In step 304, material parameters are chosen for each region. In step 306, a determination is made as to what basis functions to use for solving the electromagnetic fields. In an embodiment, the basis functions are parameterized solution to the electromagnetic equations in a homogeneous region. In step 308, the action is extremized (e.g., minimized), which may involve adjusting the parameters of the parameterized basis functions to extremize the action integral at the boundary between homogenous regions. In step 310, the output of action extremizer 201 is formatted and presented to the user.

In an embodiment, each of the steps of method 300 is a distinct step. In another embodiment, although depicted as distinct steps in FIG. 3, step 302-310 may not be distinct steps. In other embodiments, method 300 may not have all of the above steps and/or may have other steps in addition to or instead of those listed above. The steps of method 300 may be performed in another order. Subsets of the steps listed above as part of method 300 may be used to form their own method.

Figure 4:
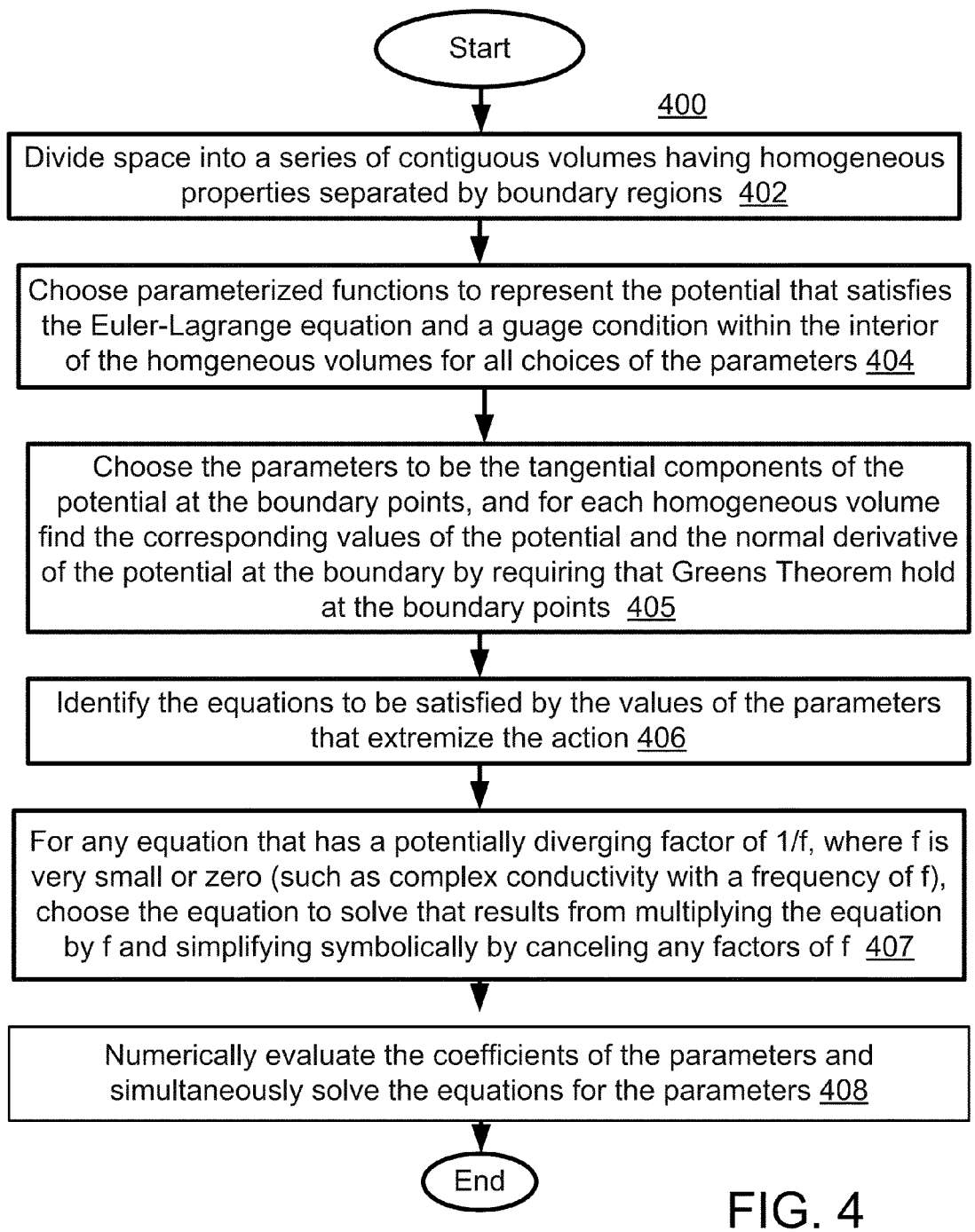
FIG. 4 is a flowchart of an embodiment of a method for solving the electromagnetic equations.

FIG. 4 is a flowchart of an embodiment of a machine implemented method 400 for solving the electromagnetic equations. Method 400 may be an embodiment, of step 308 of method 300. In step 402, the region in which the problem is being solved is divided into a series of homogenous regions, each homogeneous region being a region in which electromagnetic properties of the material such as permittivity, permeability, and electrical conductivity are homogeneous throughout the region. For example, the machine may choose the dimensions of the matrices and the number of iterations in the loops in the computer code that correspond to the representing the fields and parameters of the equations that are appropriate for the chosen regions. In step 404, choose a parameterized potential function that satisfies the Euler-Lagrange electromagnetic equations in the homogeneous regions but not necessarily on the boundaries between regions, which results in the volume integrals that appear in the equation for extremizing the action to be identically zero, leaving only boundary integrals to be calculated, and choose the functions to satisfy a gauge condition to simplify subsequent calculations (The Euler-Lagrange electromagnetic equations are typically written using tensor algebra or geometric algebra of space-time and are equivalent to Maxwell's inhomogeneous equations—the two equations without charge density or current—which are typically written using vector algebra of 3D space. The other two of Maxwell's equations are equivalent to a mathematical identity when written using tensor or geometric algebra of space-time. A practical choice of such a parameterized potential function is a sum of terms, each term equal to a parameter times a basis function. In step 405, the potential is further characterized by choosing how the potential is parameterized (tangential components of the potential values on the boundary in space-time) and calculating an expression that gives other necessary values (the non-tangential component, and all components of the normal derivative) in terms of the parameters (the tangential components of the potential in space-time are equal to the tangential components of the 3D space vector potential and the scalar potential). For example, the user may enter a choice of basis functions and/or the machine may automatically choose the basis functions depending on the homogeneous regions chosen in step 402. In step 406, the equations to be satisfied by the parameters are identified by writing them as symbolic equations appropriate for choices made so far. The machine may automatically write/determine the equations based on the choices made so far. Alternatively, the user may be offered a choice of equations to solve and/or may be provided with a field for entering the equation that the user desires to solve. For the choices made here, each of these equations contains a term for each parameter, multiplied typically by one boundary integral. In step 407, for any one of these equations that has a potentially diverging factor of 1/f where f may be very small or zero, as will typically occur if the problem contains an electrical conductor that is represented by a complex-value permittivity, the equation is first multiplied by f and simplified symbolically to cancel any factors of 1/f before numerical evaluation of coefficients of parameters in the equation. Step 407 may be performed as a result of user input making entering the choice or the code may automatically identify the 1/f dependence and choose the equations resulting form the multiplication by f as the equation to solve. In the last step, 408, the equations are solved by the computer for numerical values of the parameters.

In an embodiment, each of the steps of method 400 is a distinct step. In another embodiment, although depicted as distinct steps in FIG. 4, step 402-406 may not be distinct steps. In other embodiments, method 400 may not have all of the above steps and/or may have other steps in addition to or instead of those listed above. The steps of method 400 may be performed in another order. Subsets of the steps listed above as part of method 400 may be used to form their own method.

Regions and Boundaries

Figure 5:
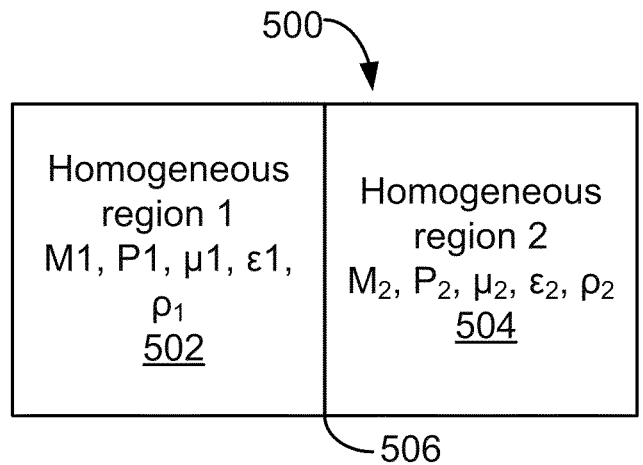
FIG. 5 shows an example of homogeneous regions for computing the electromagnetic fields.

FIG. 5 shows an example 500 of homogeneous regions. Example 500 includes region 502, region 504, and boundary 506. One region may have a finite extent and be completely surrounded by the other, and one region may extend to infinity in all directions and completely surround the other. In other embodiments, example 500 may include additional components and/or may not include all of the components listed above.

Region 502 is homogeneous region 1, which has a homogeneous set of material parameters. In other words, throughout region 502 each of the material parameters is assigned a uniform value. The material parameters may include the permittivity (or susceptibility), permeability, polarization, magnetization, resistivity (or conductivity), for example. Parameter may also be included that specify the charge density and current density. A specified electric polarization or magnetization may be represented by the corresponding specified bound charge or bound current densities. Region 504 is homogeneous region 2, which also has a homogeneous set of material parameters, which may be different than those of region 502. Boundary 506 separates region 502 and region 504, and in an embodiment, is where the computations are primarily formed. Region 502 and region 502 may represent two physical regions that have distinctly different sets of material parameters with the same values as assigned during the computations. A region having a continuously varying set of material parameters may be modeled in various ways, such as by dividing the region into smaller regions of homogeneous material parameters.

Figure 6:
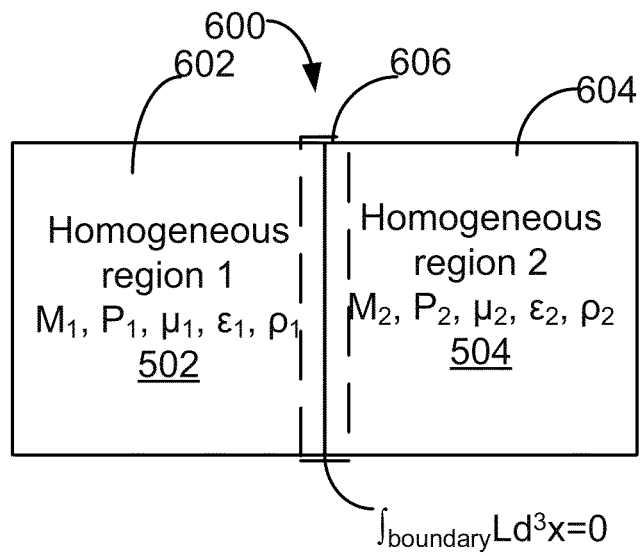
FIG. 6 shows an example of computational regions corresponding to the homogeneous regions of example with a thin boundary region.

FIG. 6 shows an example 600 of computational regions corresponding to the homogeneous regions of example 500. Example 600 includes region 602, region 604, and boundary 606. In other embodiments, system 600 may include additional components and/or may not include all of the components listed above.

Region 602 is an interior region of homogeneous region 1, and region 604 is an interior region of homogeneous region 2. In this specification, region points may generally be considered to exclude boundary points, but the phrase "interior region point" or "non-boundary point" may be used to make it explicitly clear that the point is in the region and not a boundary point if it is important in a discussion that the point is not a boundary point. In region 602 and region 604 no actual computations may need to be carried out. Each potential basis function extends over all of space and the potential basis function, or a potential related by a gauge transformation to the potential basis function, is continuous at all points of space, which in the example of FIG. 6 includes regions 602 and 604. Each such continuous potential function, though, typically has a "kink" across a boundary, corresponding to discontinuity in the derivative of the function. The values of any given basis function $a_i$ in either or both region 602 and region 604 may be defined with the help of virtual sources, although different virtual sources will be used for each region and the material parameters, such as polarizability, of each region may differ. The computational parameters, or simply the parameters (e.g., the coefficient $c_i$ multiplying each basis function in the expressions for any of the potential or electromagnetic fields, such as $A=\Sigma a_j c_j$), are independent of region or position in space or time.

Boundary 606 includes points representing a boundary between two regions. Boundaries are modeled as mathematical surfaces, which are usually smooth. A real physical boundary may be very close to a mathematical surface, such as the boundary between a glass and air, or may have some small, but negligible, thickness, such as the boundary between a piece of wood and adjacent concrete. The computation of the electromagnetic fields by extremizing the action integrals, are primarily performed using integrals over the points of boundary 606, allowing the computational parameters $c_i$ to be chosen to extremize the action.

The word "region" is generally used to refer to a volume containing material with uniform polarizability since solutions to the wave equation are well known in the instant case, but regions with non-uniform polarizability may also be used, especially if solutions are known. Also, although the polarizability may be discontinuous across the boundary between regions, the polarizability is not necessarily discontinuous. For example, a volume with uniform polarizability can be divided into two regions, joined by a boundary across which the polarizability does not change. Dividing the volumes into two regions can be convenient for various reasons. For example, dividing the volume into two regions allows the use of different methods of defining basis functions in these two adjacent regions for faster or more accurate computations.

Volumes in 4D space-time may be denoted by u, and 3D boundaries in 4D space-time may be denoted by β. Volumes in 3D space may be denoted by V, and 2D boundaries in 3D space may be denoted by s.

Example Using Green's Theorem

In following section illustrating an example using Green's Theorem, the problem of calculating the fields at all points for a simple example of a planar sheet of oscillating current parallel to a planar boundary between two media with different polarizabilities is solved.

Figure 7:
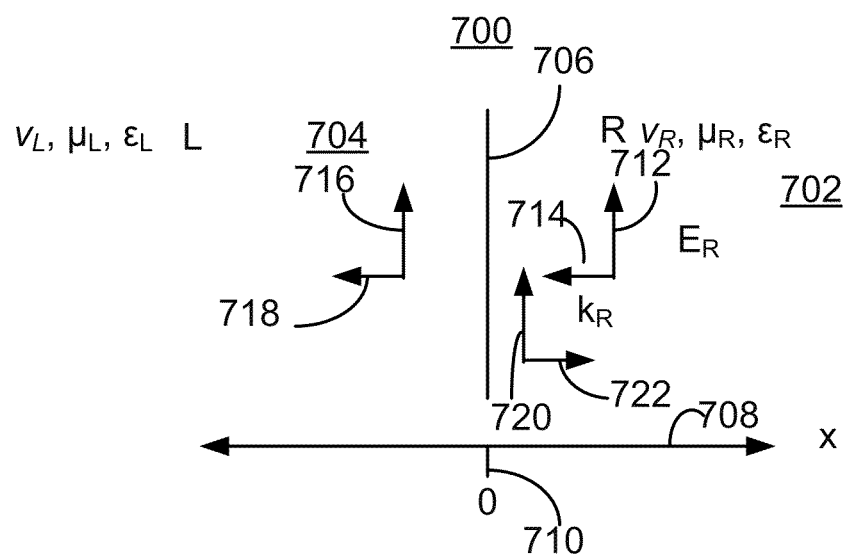
FIG. 7 shows is a diagram illustrating elements of an example to which the least action method is applied.

FIG. 7 shows a diagram illustrating elements of an example 700 to which the method of least action is applied. Example 700 includes medium 702, medium 704, interface 706, z-axis 708, and origin 710. A person familiar with electromagnetism may also use the ideas of incident wave 712, travel direction 714, transmitted wave 716, travel direction 718, reflected wave 720, and travel direction 722. The ideas of FIG. 7 are not needed with the method using Green's theorem, but the ideas of FIG. 7 are identified here to help explain the method.

Consider example 700 in which an oscillating current sheet is the source of a plane wave that is incident on a flat boundary between two regions with homogenous electric and magnetic polarizabilities, with the direction of wave propagation perpendicular to the surface. In FIG. 7, medium 702 is the medium on the right side of the diagram and the functions and quantities associated within medium 702 have the subscript R. Medium 702 has a permittivity $\in_R$ and a permeability of $\mu_R$. The phase velocity of waves in medium 702 regions is $v_R=1/\sqrt{\mu_R \in_R}$, and the wave number in medium 702 is $k_R=\omega/v_R$, where ω is the angular frequency of the wave. In other problems other factors may be considered.

Similarly, medium 704 is the medium on the left side of the diagram and the functions and quantities associated within medium 704 have the subscript L. Medium 704 has a permittivity $\in_L$ and a permeability of $\mu_L$. The phase velocity of waves in medium 704 regions is $v_L=1/\sqrt{\mu_L \in_L}$, and the wave number in medium 702 is $k_L=\omega/v_L$. It may be assumed that mediums 702 or 704 are idealized in the sense that neither is conductive and both transmit electromagnetic waves without loss, or a complex permittivity may be used to represent electrically conductive media with resistivity.

Interface 706 is the interface between the two media. In the coordinate system of FIG. 7, z-axis 708 indicates the position of the waves traveling within mediums 702 and 704. Origin 710 is the point on z-axis 708 at which the value of the position coordinate is 0. Although the physics does not depend on the coordinate system, the choice of coordinates simplifies the computations, so that issues that do not relate to the demonstrating the method do not need to be discussed.

Incident wave 712 is a plane wave of light entering from the right hand side of FIG. 7. The source of the incident wave is modeled as a sheet of oscillating current perpendicular to the z axis. The source of incident wave 712 and the material parameters of media 702 and 704 are the inputs to the problem. The incident wave (that would be due to the source if the incident wave were not interacting with the system being simulated) may alternatively be an input instead of the source of the wave, but in the current example the simpler method of using the source as input is applied. Travel direction 714 is the direction in which incident wave 712 travels.

Similarly, reflected wave 720 is a wave of light that was reflected from interface 706 as a result of incident wave 712 hitting interface 706. Travel direction 722 is the direction in which reflected wave 720 travels, which is the opposite direction as the travel direction 714 of incident wave 712. Whereas, transmitted wave 716 is a wave of light that was transmitted through interface 706 as a result of incident wave 712 hitting interface 706. Travel direction 718 is the direction in which transmitted wave 716 travels, which is the same direction as incident wave 712 (the wave vector of transmitted wave, $\vec{k}_L$, is therefore parallel to $\vec{k}_R$, but has a different magnitude).

Using the method of least action to solve for the resulting fields in example 700, a set of basis potential functions must first be specified. Applying the method of least action requires specifying boundary values and the differential equation that is satisfied at non-boundary points. It is not yet necessary to actually find expressions for the basis functions, and it is simpler not to.

The current example is done using Green's theorem methods. With Green's theorem, the basis functions satisfy the wave equation and the Lorenz condition in media at all non-boundary points, so that the volume integrals in the action are zero. The basis function $a_0$ is chosen to satisfy $\nabla \cdot g_0 = J$ for the specified current source J and $a_0=0$ on the boundary, and basis function $a_1$ to satisfy $\nabla \cdot g_1=0$ and $a_1=1$ on the boundary. There are no other independent boundary conditions that meet the given symmetries of the instant problem, so there are only the two basis functions $a_0$ and $a_1$ needed to solve the problem of example 700.

Applying the method of least action requires the knowing of the parameterized value of the potential A on all boundaries, and of the change AG in the electromagnetic field G across all boundaries. The potential $A=a_0c_0+a_1c_1$ is directly parameterized on the boundaries, so the potential's value at boundary points is known. The field G is a function of the field F, which is a function of derivatives of the potential A. Specifically, the field F is given by $F=\nabla A=nn \cdot \nabla A+n\hat{n} \nabla A$, where n is a unit space-time vector perpendicular, or normal, to the boundary. The derivative tangential to the boundary, which is $\hat{n} \nabla A$, is zero by the assumed symmetry in the current problem, and the derivative perpendicular to the boundary, which is $n \cdot \nabla A$, can be found using Greens function methods as follows.

Let the permittivity be $\in_R$ and permeability be $\mu_R$ for $0<z$ (points to the right), and $\in_L$ and $\mu_L$ for $z<0$ (points to the left), and let the physical source $J[z]$ be a an oscillating uniform current sheet located at $z=z_J>0$ with current in the x direction, perpendicular to z. The current sheet radiates with wave number $k_R$.

All information necessary to solve the instant problem with only the given information and using Greens function methods can be found without explicitly finding any basis functions. The method of extreme action is done first, and then the basis functions using Greens function methods are found explicitly.

Let the current sheet be oscillating parallel to the x axis, which has unit vector $\hat{z}$. The parameterized potential A to be used to extremize the action is the sum of the basis potential functions, which may be written as, $$A[z]=c_0 a_0[z]+c_1 a_1[z]$$

To extremize the action, the variation $\delta S$ of S with respect to variation of the parameters $c_i$ for $i \neq 0$ must be equal to zero. In the current example the only non-zero value of i is i=1, so the requirement that the variation of the action be equal to 0 may be written as $$\iint_{x,y} a_1 \cdot (n \cdot \Delta g_1) dx dy \, c_1 = -\iint_{x,y} a_1 \cdot (n \cdot \Delta g_0) dx dy \, c_0$$

By assumption in the instant problem all functions are independent on the position $\{x, y\}$ on the boundary, which implies that the integrands are equal:

$$a_1 \cdot (n \cdot \Delta g_1) c_1 = -a_1 \cdot (n \cdot \Delta g_1) c_0$$

Rewriting the 4D space-time quantities in the preceding equation in terms of corresponding 3D quantities in an inertial frame of the boundary with frame vectors parallel to the coordinate axes, and using the fact that with only a 3D vector source (the current sheet) the scalar potential is zero in the current example and $c_0=1$, results in the equation $$\vec{a}_1 \cdot (\hat{z} \times \Delta \vec{h}_1) c_1 = -\vec{a}_1 \cdot (\hat{z} \times \Delta \vec{h}_0)$$

so that c1 satisfies $$c_1 = -\frac{\vec{a}_1 \cdot (\hat{z} \times \Delta \vec{h}_0)}{\vec{a}_1 \cdot (\hat{z} \times \Delta \vec{h}_1)}$$

This represents the solution that extremizes the action. But at this point we do not yet have expressions for the changes $\Delta \vec{h}_i$ in the magnetic field basis functions across the boundary. To calculate a numerical solution an expression of the changes $\Delta \vec{h}_i$ in the magnetic field basis functions across the boundary are needed.

Changes $\Delta \vec{h}_i$ in the magnetic field basis functions across the boundary are calculated using the field $$f_i = \nabla a_i = \nabla \gamma_0 \gamma_0 a_i = \left(\frac{1}{c} \partial_t - \vec{\nabla}\right)\left(\epsilon_0 \phi_i - \frac{1}{c \mu_0} \vec{a}_i\right).$$

Using complex vector notation for harmonic variation at frequency $\omega$ and the fact that in the current example the scalar potential $\phi_i$ equals zero (since there is no charge density source) and since therefore $\vec{\nabla} \cdot \vec{a}_i$ also equals zero (by the Lorenz condition), $f_i$ is given by $$f_i = \left(-\frac{i\omega}{c} - \vec{\nabla}\right)\left(-\frac{1}{c\mu_0}\vec{a}_i\right) = \frac{1}{c^2 \mu_0} i\omega \vec{a}_i + \frac{1}{c\mu_0}\vec{\nabla} \bigwedge \vec{a}_i$$

Comparing the above expression for $f_i$ with the expression $$F = \varepsilon_0 \vec{e}_j + \frac{1}{c\mu_0} III \vec{b}_j,$$

results in $$\vec{b}_i = \vec{\nabla} \times \vec{a}_i$$

and $$\vec{e}_i = i\omega \vec{a}_i$$

In the current example with all fields independent of x and y, we have $$\vec{b}_i = (\hat{z} \partial_z) \times \vec{a}_i = \hat{z} \times \partial_z \vec{a}_i$$

and therefore $$\vec{h}_i = \frac{1}{\mu} \vec{b}_i = \frac{1}{\mu} \hat{z} \times \partial_z \vec{a}_i$$

Next the normal derivatives $\partial_z \vec{a}_i$ of the potential on the boundary must be found. Although in this simple example it is possible to correctly guess that a simple plane wave is a useful basis function and using plane waves the normal derivative and other quantities can be calculated, for the general case of arbitrary curved boundaries convenient basis functions are difficult to guess. Consequently, in this example the general method using Green's theorem methods is illustrated. The normal derivative values of the Green's theorem method will allow the calculation of the required changes $\Delta \vec{h}_i$ in $\vec{h}_i$.

Greens' theorem can be inverted to find the normal derivative of the potential on the boundary as a function of the values of the potential on the boundary. The general 3D result as applied to a complex 3D vector potential $\vec{a}_i$ may be written $$\vec{a}_i[\vec{r}'] = \oiint_{s=\partial V}(-\hat{n} \cdot \vec{\nabla}_r \psi[\vec{r} - \vec{r}']\vec{a}_i[\vec{r}] + \psi[\vec{r} - \vec{r}']\hat{n} \cdot \vec{\nabla}_r \vec{a}_i[\vec{r}])ds +$$

$$\iiint_V \psi[\vec{r} - \vec{r}'] J[\vec{r}] dV$$

We can evaluate these integrals using polar coordinates $\{\rho, \phi, z\}$ to describe vectors $\vec{r} = \rho \cos[\phi] \hat{x} + \rho \sin[\phi] \hat{y} + z \hat{z}$ with the z axis chosen to be perpendicular to the boundary. We take the current density $J_i$ to be uniform and nonzero for i=0 at $z=z_J>0$, and equal to 0 for i=1. The integrals can be evaluated with the result $$\vec{a}_i[z'] = \text{Sign}[z']\chi'[z-z']\vec{a}_i[z] - \text{Sign}[z']\chi[z-z']\vec{a}_i'[z] + \chi[z_j - z']J_i$$

where $$\chi[z] = \int\int \psi[\rho, \varphi, z]\rho d\rho d\varphi = -\frac{1}{2ik}e^{ik\sqrt{z^2}}$$

$$\chi'[z] = \partial_z \chi[z] = -\text{Sign}[z]\frac{1}{2}e^{ik\sqrt{z^2}}$$

and we've used the fact that $\hat{n}$ is by definition a vector that points away from the region containing z' to write $$\hat{n}\cdot\vec{\nabla}_{r'} = -\text{Sign}[z']\partial_z,$$

Although the basis functions and Greens function are continuous at all points, their derivatives are discontinuous at z=0, so we must be careful when evaluating quantities near z=0. We evaluate the boundary integral at z=+∈/2 or z=−∈/2 where E is a very small positive number, depending on which side of the boundary we're interested in. For functions that are continuous across the boundary, we can replace ∈ with 0. The equation for $\vec{a}_i[z']$ then becomes $$\vec{a}_i[z']=\text{Sign}[z']\chi'[-z']\vec{a}_i[0]-\text{Sign}[z']\chi[-z']\partial_z \vec{a}_i[\pm\in/2]+\chi[z_j-z']J_i$$

z' is now evaluated close to the boundary, at some small number with the same sign as z but with at least slightly larger magnitude than z—we use z'=±Σ. Then $$\vec{a}_i[\pm\epsilon] = \frac{1}{2}\vec{a}_i[\pm\epsilon] + \text{Sign}[\pm\epsilon]\frac{1}{2ik_\pm}\partial_z\vec{a}_i[\pm\epsilon/2] - \frac{1}{2ik_\pm}e^{ik_\pm z_J}J_i$$

The source current amplitude J, is chosen so that source current amplitude J creates a potential of unit amplitude at the boundary for i=0 of $$\frac{1}{2ik}e^{ikz_J}J_i = \hat{x}\delta_{i,0}$$

Then $$\partial_z\vec{a}_i[\pm\in]=\text{Sign}[\pm\in]ik_\pm(\vec{a}_i[\pm\in]+2\hat{x}\delta_{i,0})$$

This is 4 equations, for +∈ and −∈, for each value 0 or 1 of i. These 4 equations are $$\partial_z\vec{a}_0[+\in]=2ik_+$$

$$\partial_z\vec{a}_0[-\in]=0$$

$$\partial_z\vec{a}_1[+\in]=ik_+$$

$$\partial_z\vec{a}_1[-\in]=-k_+$$

Next, these derivatives are used to find the change across the boundary in the field:

$$\Delta\vec{h}_0 = \vec{h}_0[+\varepsilon] - \vec{h}_0[-\varepsilon] =$$

$$\frac{1}{\mu_R}\hat{z}\times\partial_z\vec{a}_0[+\varepsilon] - \frac{1}{\mu_L}\hat{z}\times\partial_z\vec{a}_0[-\varepsilon] = -\frac{1}{\mu_R}2\hat{y}ik_R - 0 = -2\hat{y}i\frac{k_R}{\mu_R}$$

and $$\Delta\vec{h}_1 = \vec{h}_1[+\varepsilon] - \vec{h}_1[-\varepsilon] = \frac{1}{\mu_R}\hat{z}\times\partial_z\vec{a}_1[+\varepsilon] - \frac{1}{\mu_L}\hat{z}\times\partial_z\vec{a}_1[-\varepsilon] =$$

$$-\frac{1}{\mu_R}(\hat{y}ik_R) + \frac{-1}{\mu_L}(\hat{y}ik_L) = -\hat{y}i\left(\frac{k_R}{\mu_R}+\frac{k_L}{\mu_L}\right)$$

Then the transmission amplitude is $$c_1 = -\frac{\vec{a}_1\cdot(\hat{z}\times\Delta\vec{h}_0)}{\vec{a}_1\cdot(\hat{z}\times\Delta\vec{h}_1)} = -\frac{2\frac{k_R}{\mu_R}}{\frac{k_R}{\mu_R}+\frac{k_L}{\mu_L}}$$

with transmission intensity $$|c_1|^2 = \left|\frac{2\frac{k_R}{\mu_R}}{\frac{k_R}{\mu_R}+\frac{k_L}{\mu_L}}\right|^2$$

These results can be used to write either basis function at any point. For example, for i=1 and the region L for which z'<0, the i=1 basis function is $$\vec{a}_1[z'] = -\partial_n\chi[-z']\vec{a}_1[0] + \chi[-z']\partial_n\vec{a}_1[0] =$$

$$+\frac{1}{2}\text{Exp}[-ik_L z'] + \frac{1}{2}\text{Exp}[-ik_L z'] = +\text{Exp}[-ik_L z']$$

while the i=0 basis function equals 0 for z'<0, so the potential A for z'<0 is $$A[z']=c_1\text{Exp}[-ik_L z']$$

which represents a leftward traveling wave on the left side of the boundary.

The expression for A[z'] might be used at the "start" of a solution by someone with some familiarity and intuition about the problem and using a different solution method. A key feature of the method disclosed here is that even for complex 3D problems, no familiarity or intuition is needed because the solution method is an unambiguous recipe that applies to all circumstances with no free parameters and can be easily calculated on a computer.

A 3D Example

Figure 8:
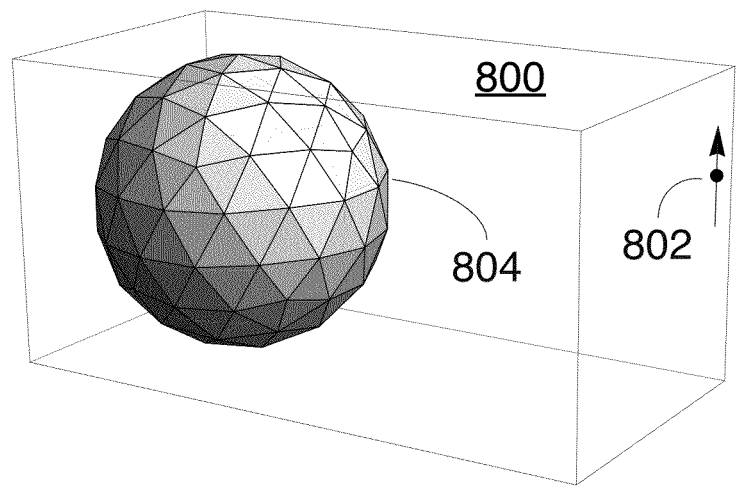
FIG. 8 shows another sample problem having a dielectric sphere and a point dipole.

FIG. 8 shows a sample problem 800. Sample problem 800 includes dipole 802, polarizable sphere 804. Dipole 802 has a moment pointing in the direction of the arrow representing the dipole. Polarizable sphere 804 is made from a homogeneous polarizable material and the space outside of the sphere is nonpolarizable. The surface of the sphere 804 is approximated by connected triangles. The objective of problem 800 is to solve for the electric and magnetic fields induced by dipole 802 inside and outside of the sphere. The problem will not be completely solved here, but the calculation of basis functions using two methods that may be used to solve the problem, Green's theorem and virtual sources, will be discussed.

Space may be divided into two regions for the purposes of computing the electromagnetic field in the example of FIG. 8. One region may be the interior of the sphere 804, the other region may be everything outside of sphere 804, and the surface of the sphere is the boundary between these two regions. Other methods of defining basis functions may additionally divide either or both of these two regions (the region including the inside of sphere 804 and the region including everywhere else) with homogeneous polarizability into two or more regions.

A general method for defining a set of basis functions using either Green's Theorem or virtual sources is to first i) for each basis function, specify the values of the tangential components of the space-time vector potential field at all boundary points between homogeneous regions, then ii) specify expressions or a method for quickly calculating potential values and field values at any boundary point from the specified tangential potential components, for a potential that satisfies the Euler-Lagrange equation at all non-boundary points. Specifying the values of the tangential components of the space-time vector potential field at all boundary points between homogeneous regions, and specifying expressions or a method for quickly calculating field values at any boundary point allows the action to be extremized. After extremizing the action, it is necessary to iii) quickly calculate at least field values and possibly potential values at any non-boundary point.

First consider step i) in FIG. 8. For basis index i=0, choose the potential be zero at all boundary points, and to satisfy the Euler-Lagrange equation, with J equal to the specified source dipole 802, at all non-boundary points. For each basis function i≠0, choose the potential to be nonzero at only one vertex on the boundary, to be a linear function of position on each triangular segment of the boundary, to be continuous at all points, and to satisfy the Euler-Lagrange equation with J=0 at all non-boundary points. For each boundary vertex, define a vector ft that is normal to the physical boundary (such as, for example, an average of the normal vectors of the triangles that share that vertex), and choose three basis potential functions: one with nonzero scalar potential, and two with specified vector potential values perpendicular to the normal 3D space vector at that vertex (the normal vector component is one of the unknowns that is found).

Now consider step ii) in FIG. 8: step ii) can be done using Green's theorem following the recipe previously outlined. Alternatively, if virtual sources are being used, for each basis function, choose a set of virtual sources inside the sphere to define the basis function outside the sphere such that the discrepancy between the potential calculated from the virtual sources and the specified boundary values for the basis potential is minimized, or more accurately reduced to within an acceptable tolerance. Similarly, a set of virtual sources may be chosen outside the sphere to define the basis function inside the sphere. Each virtual source may be a parameterized collection of point charges, point electric dipoles and/or magnetic dipoles, or more complex sources. After the virtual sources are chosen to define a basis potential, the same virtual sources may be used to calculate the corresponding electric and magnetic field F or G. Next, for each of the basis potentials, which are derived from the physical and virtual sources, the potential inside the sphere may be defined as a linear combination of potentials due to virtual sources located outside the sphere. For convenience a linear combination of the same set of virtual sources may be chosen for each basis function, but for each basis function the coefficients of the combination is chosen that gives the smallest integrated error relative to the specified values of the basis function on the boundary. Note that these coefficients are in addition to the parameters $c_j$ used to extremize the action.

There is now a set of basis functions, $a_j$, each one defined over all of space, that can be used to define a parameterized potential $A=\Sigma_j a_j c_j$. The parameters $c_j$ are chosen to extremize the action. The parameterized potential A results in an associated set of volume integrals that equal zero at all non-boundary points for any set of parameter values $c_i$. Although the potential resulting from using virtual sources may only approximately satisfy the Lorenz-gauge-equivalent boundary conditions, more virtual sources can always be chosen, so that the error is smaller than any required value.

The following paragraphs provide greater emphasis on technical details.

Figure 9:
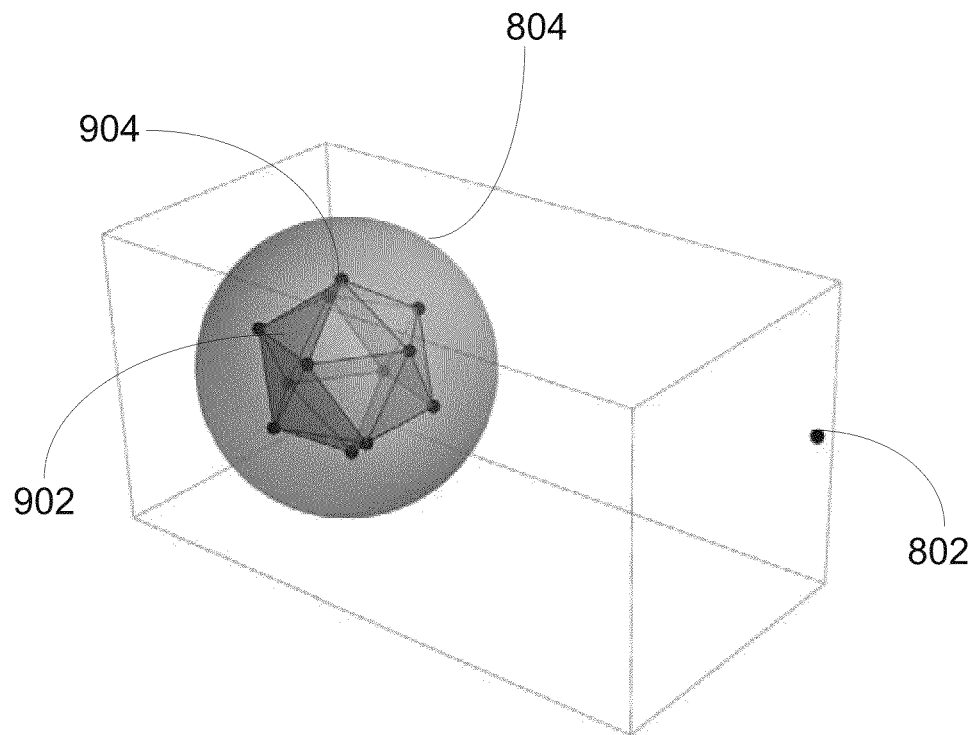
FIG. 9 shows an example of a placement of virtual sources inside the sphere of FIG. 8 for computing the basis potential functions outside of the sphere.

FIG. 9 shows an example 900 of a placement of virtual sources inside the sphere. Example 900 shows sphere 804 with a polyhedron 902 inside having virtual dipoles 904 at the vertices of the polyhedron that is inside the spherical boundary. Polyhedron 902 is used to aid in locating the dipoles 904, which are placed close to the inner surface of the sphere 802. Dipoles 904 are used to generate the basis potentials $a_i$ outside the sphere. The potential in the outer region from each dipole 904 in the inner region is used as a different basis function $a_i$ having a unit dipole moment. For each basis potential $a_i$ defined outside the sphere with the help of just one virtual dipole, the basis potential $a_i$ is defined inside the sphere as a linear combination of potentials due to virtual dipoles located outside the sphere (which are discussed further in conjunction with FIG. 10, below), with the coefficients chosen to minimize (reduce to within a predetermined acceptable tolerance) the effective discontinuity of the basis potential $a_i$ across the surface of the sphere. A possible measure of effective discontinuity is described in another section. The end result is a set of basis functions, with each basis function defined outside the sphere by one virtual dipole (or one real dipole in the case of i=0), and defined inside the sphere by a linear combination of virtual dipoles (a different combination for each value of the index i). The coefficients of the linear combination used to define the basis function for each basis index i are determined early in the solution by minimizing the discontinuity at boundary points, and are in addition to the parameters $c_i$ that are later chosen to extremize the action.

Figure 10:
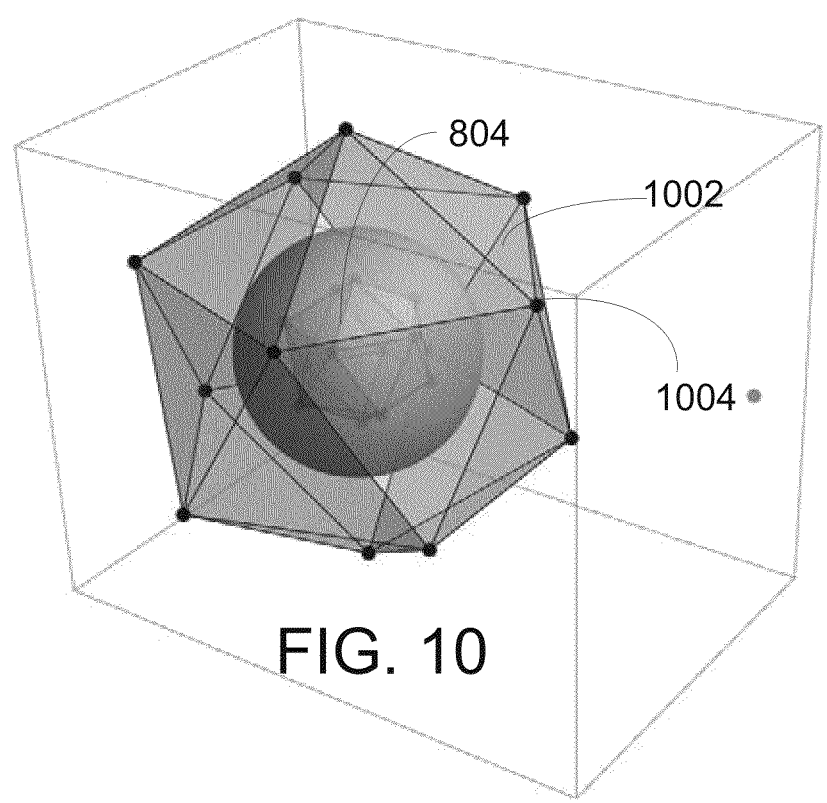
FIG. 10 shows an example of a placement of virtual sources outside the sphere of FIG. 8 for computing basis function within the sphere.

FIG. 10 shows an example 1000 of a placement of virtual sources outside the sphere. Example 1000 shows sphere 802 with a polyhedron 1002 outside having virtual dipoles 1004 at the vertices of the polyhedron. Polyhedron 1002 is used to aid in locating the dipoles 1004, which are placed close to the outer surface of the sphere 802. Dipoles 1004 are used to generate the basis potentials $a_i$ inside the sphere. For each basis function $a_i$, already defined in the outer region and on the spherical boundary as the potential resulting from one dipole source, the potential $a_i$ is defined inside the sphere by a linear combination of the potential resulting from dipoles 1004 outside the sphere, with the amplitudes of the dipoles chosen to minimize the discontinuity in the basis potential at the boundary. Each resulting basis potential $a_i$ is defined at all points in space, and is used to define the parameterized potential $A=\Sigma_j a_j c_j$.

Figure 11:
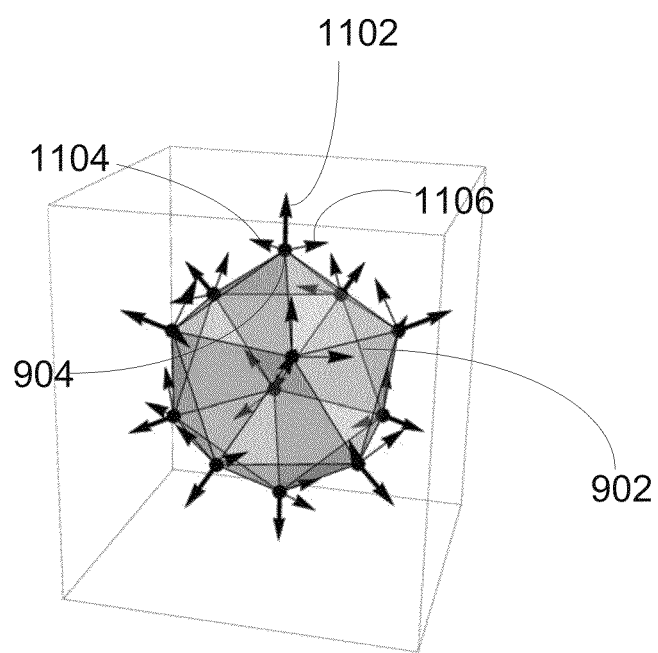
FIG. 11 shows an example of an arrangement of virtual point dipoles on the polyhedron of FIG. 9.

FIG. 11 shows an example 1100 of an arrangement of dipoles on the polyhedron. Example 1100 shows polyhedron 902 with virtual dipoles 904 at the vertices of the polyhedron and electric dipole 1102, magnetic dipole 1104, and magnetic dipole 1106. Electric dipole 1102 points towards the surface of the sphere and is perpendicular to the surface of the sphere. Magnetic dipoles 1104 and 1106 are perpendicular to the electric dipole 1102 and are therefore parallel to the surface of the sphere at the point on the sphere to which the electric dipole points.

It can be shown that only the scalar potential and the tangential part of the vector potential need to be defined and be continuous at boundary points, in order to specify a potential throughout all of space that uniquely determines the fields. All possible potentials can be specified, to some level of approximation, by dividing the boundary into boundary sections, and specifying the average scalar potential and tangential vector potential on each boundary section. One simple choice of dipoles to generate an approximation to such potential values on the boundary, and to generate the associated potential throughout a region, is one electric dipole near each boundary section with a moment perpendicular to the nearby boundary, and two magnetic dipoles near each boundary section with moments tangential to the nearby boundary. Three such dipole moments at each vertex are represented in FIG. 11, which represents 36 dipole moments and corresponding degrees of freedom.

At a frequency equal to zero, one pair of virtual dipoles one inside and one outside the sphere—at the correct locations can be used to define the exact solution for the fields of the simple ideal case of a real dipole located outside of a polarizable sphere. But in more general cases, such as non-zero frequencies, non-spherical objects, and applied fields from sources more complex than point dipoles, the exact solution method of solving for the field resulting from a charged object outside of the shape does not apply and may be difficult to implement even approximately, while the method of least action with basis functions defined with the help of virtual sources may be applied with good results.

Each basis function $a_i$ (resulting from a dipoles near the surface the object inside and outside of the object) described above is approximately continuous everywhere, and a linear combination $A=\Sigma_j a_j c_j$ of these basis functions satisfies the Euler-Lagrange equation at every non-boundary point for any set of parameter values $c_i$ for $i \neq 0$ and with $c_0=1$, but does not generally satisfy the Euler-Langrange equation at boundary points. As outlined earlier, values of the parameters $c_j$ in the linear combination of basis functions that form the parametized potential extremize the action.

Although point dipole virtual sources are very useful for representing and visualizing geometry, and have very simple and easily calculated potentials and fields, for smoother fields, smoother virtual charge and current densities may be used instead of point dipoles.

Example of a 2D Simplex Mesh

Figure 12:
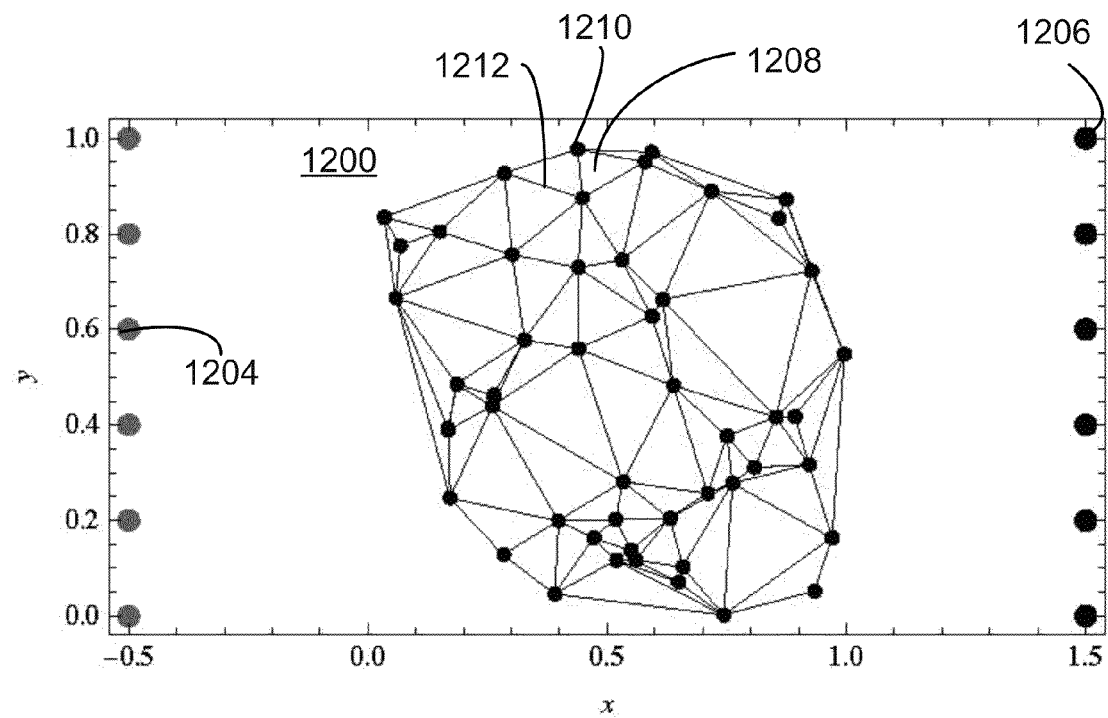
FIG. 12 shows an example of using a mesh of simplices for computing a field.

FIG. 12 shows an example 1200 of a mesh of simplices that may be used computing electromagnetic fields. Example 1200 includes wires 1204 and 1206, and simplices 1208 having nodes 1210 and boundaries 1212.

FIG. 12 shows a two-dimension problem, which was chosen because the situation of FIG. 12 can be graphically represented in 2D. FIG. 12 there is a metal object that varies in the x and y directions (in the plane of the paper), and extends very far in the z direction (perpendicular to the paper) so that the situation may approximate a 2D problem, with all quantities independent of z and with harmonic dependence on time.

Wires 1204 have a current that travels out of the paper in the left (which are represented by large grey dots), wires 1206 have a current that travels into of the paper on the left (which are represented by large black dots). Wires 1204 and 1206 may represent a coil that is stretched in the z direction.

Computation of the resulting field may be performed on a mesh of simplices. Simplices 1208 are an example of a mesh of simplices that may be used for performing the field computations. Nodes 1210 are the vertexes of the simplices, and boundaries 1212 are the walls between the simplices (connecting the vertexes). The size of the simplices may be varied according to the amount of variation expected in a particular region. Areas with higher variation in the field may include a larger number of simplices, but the simplices will tend to be smaller than other areas, and areas with less variation in the fields may be have a smaller number of simplices, but the simplices will tend to be larger.

Such a problem can usefully model characteristics of a real 3D situation, but with much less computation. The equations are solved using integrals over the interior of each simplex 1208 and integrals over the boundaries 1212 of each simplex. As in FIG. 12, simplices need not be used throughout the entire region in which the field is being computed, but rather may be used, for example, for regions containing nonlinear media such that the field may be approximated as being uniform within each simplex.

Other methods of defining computationally useful regions of space may also be used. For example, if the physical situation is symmetric with rotation about an axis, simplices in a 2D half-plane bounded by the axis may be defined, and then 3D volumes of rotation may be defined and the 3D volumes may be associated with virtual sources by rotating the simplices about the axis.

Nonlinear Embodiments

The potential A is a function of the parameters $c_i$. For simplicity take the parameterization to be linear in the parameters. If a parameterization is chosen that is nonlinear in the parameters, a solution may be found that extremizes the action by any of various other methods, such as Newtonian iteration with linearized approximations to the potentials and fields.

Also, for simplicity it has been assumed that the fields G, $\vec{D}$, and $\vec{H}$ are linear functions of the fields F, $\vec{E}$, and $\vec{B}$, respectively, but these may be nonlinear functions in which case the Lagrangian density may need additional corresponding terms and solutions may be found that extremize the action by any of various methods, such as using perturbation theory and choosing a set of basis functions that includes a fundamental frequency and harmonics.

An example of a nonlinear field G is an electrically and magnetically polarizable medium with an electric polarization P that saturates according to $$P[E] = \alpha_E E_0 \text{ArcTan}\left[\frac{E}{E_0}\right]$$

and magnetic polarization M that saturates according to $$M[B] = \alpha_B B_0 \text{ArcTan}\left[\frac{B}{B_0}\right]$$

where $a_E$, $E_0$, $a_B$, and $B_0$ are constants that characterize the medium. The corresponding electric and magnetic interactions are $$U_E[E] = \frac{1}{2}\alpha_E E_0^2 \text{Log}[1 + (E/E_0)^2]$$

$$U_B[B] = \frac{1}{2}(\alpha_B/c^2)B_0^2 \text{Log}[1 + (B/B_0)^2]$$

and the Lagrangian is $$L=(\tfrac{1}{2})F \cdot F - A \cdot J_f + U$$

where $$U = U_E + U_B$$

represents the interaction between the field and the medium. Setting to zero the variation of the action with respect to parameters $c_i$ gives the same set of equations (19) but with $$G \equiv F + \nabla_F U = E + \frac{\alpha_E E}{1 + (E/E_0)^2} + \frac{1}{c} III\left(B - \frac{\alpha_B B}{1 + (B/B_0)^2}\right)$$

where $\nabla_F$ is the multivector derivative with respect to F. Because of the denominators in this expression, G is a non-linear function of E and B and therefore of F, so equation (19) is no longer linear in the solution parameters $c_i$ and computing a solution may be more difficult.

In the limit of very large parameters $E_0$ and $B_0$, the example above reduces to expressions for linearly polarizable media. In particular, $$U_E \to \frac{1}{2} E \cdot P$$

where $P = \alpha_E E$ and $$U_B \to \frac{1}{2} \frac{1}{c^2} B \cdot M$$

where $M = \alpha_B B$. We can combine this with $F \cdot F = E^2 (1/c^2) B^2$ to rewrite the Lagrangian as $$L = \left(\frac{1}{2}\right) F \cdot G - A \cdot J_f$$

where $$G = (E + P) + \left(\frac{1}{c}\right) III(B - M),$$

or alternatively and equivalently as
where $$L = \frac{1}{2} F \cdot F - A \cdot J_f + U$$

where $$U = \frac{1}{2}\left(E \cdot P + \frac{1}{c^2} B \cdot M\right)$$

represents the interaction between the electromagnetic field and the linearly polarizable medium.

Continuity Errors

In an embodiment, least action method requires that the potential be continuous at all points, including boundary points, and so computation by the method of least action is most easily analyzed for errors and understood if the potential is continuous at all points. But the potential may be discontinuous in at least two acceptable ways and the method still be useful. This is detailed below.

The first way that the potential may be discontinuous is that it may be "effectively continuous" although not continuous, where effectively continuous means that a gauge transformation can remove any discontinuity. Specifically, even after requiring the Lorenz condition, $0 = \nabla \cdot A$ in terms of space-time quantities (or $0 = (1/c)\partial_t \Phi + \vec{\nabla} \cdot \vec{A}$ in terms of 3D space quantities), for any solution $A = \gamma_0(\Phi - \vec{A})$ to these equations, $A' = A + \nabla \psi$ is also a solution if the scalar field $\psi$ satisfies $\nabla^2 \psi = 0$ (or equivalently, in terms of 3D space quantities, at least for stationary media, $\vec{A}' = \vec{A} + \vec{\nabla}\psi$ and $$\Phi' = \Phi + \frac{\partial \psi}{\partial t}$$

is also a solution if the scalar field $\psi$ satisfies $$\vec{\nabla}^2 \psi - \frac{\partial^2 \psi}{\partial t^2} = 0\bigg).$$

Since this is a 2nd order differential equation, the value of $\psi$ is uniquely determined at every point of a 4D space-time volume, if either $\psi$ or the directional derivative of $\psi$ perpendicular to the boundary is specified on the 3D boundary of the 4D volume. We can therefore always choose such a field $\psi$ to exactly cancel any discontinuity in the component of A perpendicular to any boundary in 4D space-time (or in terms of 3D space quantities, at least for stationary media, to exactly cancel any discontinuity in the component of $\vec{A}$ perpendicular to any boundary in 3D space). A potential that is continuous except for a discontinuous perpendicular vector part at a boundary is therefore effectively continuous and is not a problem.

The second way that a basis potential may be discontinuous is that the basis potential may be only approximately effectively continuous across a boundary, due to imperfect matching of basis potential values at points on the boundary between the two adjacent regions. The imperfect matching of basis potential values at points on the boundary, generally occurs with the method of virtual sources but not with the Green's Theorem method. In this case we may choose the functions defined on the two sides of the boundary for each basis potential so that some measure of total error due to discontinuity across the boundary is minimized. One useful measure of dissimilarity between the values of basis potentials on side I of the boundary, $$a_i^I = \left(\varepsilon_0 \phi_i^I + \frac{1}{c\mu_0} \vec{a}_i^I\right)\gamma_0,$$

and the values of basis potentials on side II of the boundary, $a_i^{II} =$ $$a_i^{II} = \left(\varepsilon_0 \phi_i^{II} + \frac{1}{c\mu_0} \vec{a}_i^{II}\right)\gamma_0,$$

is $$|(\nabla a_i \wedge n)\gamma_0|^2 = \varepsilon_0^2(\phi_i^I - \phi_i^{II})^2 + \frac{1}{c^2\mu_0^2}\left(\left(\vec{a}_i^I - \vec{a}_i^{II}\right)^2 - \left(\hat{n}\cdot\left(\vec{a}_i^I - \vec{a}_i^{II}\right)\right)^2\right)$$

where $\Delta a_i = a_i^I - a_i^{II}$

This expression for the local error in basis function i at a point on the boundary due to discontinuity across the boundary excludes the perpendicular vector component since the vector component perpendicular to the boundary does not need to be continuous as discussed above. The corresponding total error is the boundary integral $$\text{error}_i = \int_\beta |(\Delta a\hat{a_i} n)\gamma_0|^2 d\beta$$

This error expression can be used by choosing quantities that are used to define either or both $(\phi_i^I, \vec{a}_i^I)$ and $(\phi_i^{II}, \vec{a}_i^{II})$ such as virtual source amplitudes, such that $\text{error}_i$ is minimized. This may be done before the action is extremized. This error in continuity of a basis potential function at boundary points is independent of the results of extremizing the action.

Defining potentials so that the potentials are identically effectively continuous at boundaries, such as by using potential basis functions parameterized by values of tangential components on boundaries as described previously, has advantages of easier theoretical analysis and more accurate results, but potentials defined so that they are only approximately continuous at boundaries as outlined above may be simpler and faster to compute.

Applications

The system and method may be used to design the shape, placement, and materials for magnetic recording write heads, antenna, the core of a transformer, the core of electromagnets, permanent magnets, and/or electromagnets for generators, and/or transmission lines, electric conductors and electronic components in larger assemblies such as computers and cell phones, microwave devices, and optical devices, including optical and electro-optical integrated circuits.

Alternatives and Extensions

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A machine implemented method comprising:
computing, by a machine having a processor system including one or more processors and a memory system, numerical values for a set of parameters that extremize an action integral, the set of parameters are parameters of a parameterized electromagnetic potential and an electromagnetic field associated with the parameterized electromagnetic potential, the computing of the numerical values for the set of parameters that extremize the action integral is performed, therein numerically solving for the parameterized electromagnetic potential by computing the numerical values of the parameters, instead of solving Euler-Lagrange equations for the electromagnetic potential in at least part of a region associated with the action integral and instead of solving Euler-Lagrange equations for the electromagnetic fields in at least part of a region associated with the action integral,
the set of parameters, computed by the machine, extremizing an action integral, the action integral being an integral of an electromagnetic Lagrangian; and
computing, by the machine, the electromagnetic field based on the set of parameters that extremize the action integral.

2. A machine implemented method comprising:
computing, by a machine having a processor system including one or more processors and a memory system, numerical values for a set of parameters that extremize an action integral for a parameterized electromagnetic potential and an electromagnetic field associated with the parameterized electromagnetic potential, the set of parameters, computed by the machine, extremizing an action integral, the action integral being an integral of an electromagnetic Lagrangian; and
computing, by the machine, the electromagnetic field based on the set of parameters that extremize the action integral,
the parameterized electromagnetic potential being a linear combination of basis functions that satisfy an Euler-Lagrange equation for non-boundary points, and
as a result of the parameterized electromagnetic potential being the linear combination of basis functions that satisfy the Euler-Lagrange equation for non-boundary points, the action integral including contributions only from integrals including boundary points.

3. A machine implemented method comprising:
computing, by a machine having a processor system including one or more processors and a memory system, numerical values for a set of parameters that extremize an action integral for a parameterized electromagnetic potential and an electromagnetic field associated with the parameterized electromagnetic potential, the set of parameters, computed by the machine, extremizing an action integral, the action integral being an integral of an electromagnetic Lagrangian; and
computing, by the machine, the electromagnetic field based on the set of parameters that extremize the action integral,
wherein time-dependent quantities vary harmonically with time at one frequency, and
wherein if an equation that results from extremizing the action integral has a factor of 1/f, where f is a function of frequency that may be zero for at least one value of frequency, then this equation is multiplied by a factor of f and simplified symbolically to cancel the factor of 1/f before the full set of equations is solved numerically for the set of parameters.

4. A machine implemented method comprising:
computing, by a machine having a processor system including one or more processors and a memory system, numerical values for a set of parameters that extremize an action integral for a parameterized electromagnetic potential and an electromagnetic field associated with the parameterized electromagnetic potential, the set of parameters, computed by the machine, extremizing an action integral, the action integral being an integral of an electromagnetic Lagrangian;
computing, by the machine, the electromagnetic field based on the set of parameters that extremize the action integral; and constraining the potential to satisfy an equation that defines a gauge of the potential, as part of the computing, by the machine, of the numerical values for the set of parameters.

5. The method of claim 4, the gauge condition resulting in the Euler-Lagrange equation simplifying to a wave equation for a linear transformation of components of the electromagnetic potential.

6. The method of claim 4, wherein the gauge condition is a media Lorenz condition.

7. A machine implemented method comprising:
computing, by a machine having a processor system including one or more processors and a memory system, numerical values for a set of parameters that extremize an action integral for a parameterized electromagnetic potential and an electromagnetic field associated with the parameterized electromagnetic potential, the set of parameters, computed by the machine, extremizing an action integral, the action integral being an integral of an electromagnetic Lagrangian;
computing, by the machine, the electromagnetic field based on the set of parameters that extremize the action integral; and
parameterizing the electromagnetic potential to form the parameterized electromagnetic potential by requiring, during the computing by the machine, that the electromagnetic potential agree with a parameterized potential function on boundaries between regions of computation, the potential function satisfying a Euler-Lagrange equation at non-boundary points.

8. The method of claim 7, further comprising:
determining values of the electromagnetic potential at boundary points that are not given by the parameterized potential function, and values of normal derivatives of the electromagnetic potential at region points adjacent to the boundary of the region, by requiring that Green's theorem for the Euler-Lagrange equation and a gauge condition are satisfied at region points adjacent to the boundary of the region, and computing the electromagnetic potential and electromagnetic field in integrals over the boundaries that result when extremizing the action.

9. The method of claim 8, wherein the parameterized potential function at boundary points is the value of the potential's components tangential to the boundary in space-time.

10. A machine implemented method comprising:
computing, by a machine having a processor system including one or more processors and a memory system, numerical values for a set of parameters that extremize an action integral for a parameterized electromagnetic potential and an electromagnetic field associated with the parameterized electromagnetic potential, the set of parameters, computed by the machine, extremizing an action integral, the action integral being an integral of an electromagnetic Lagrangian;
computing, by the machine, the electromagnetic field based on the set of parameters that extremize the action integral, the computing of the set of parameters including at least solving a set of equations, by the machine, in a plurality of regions within which the polarizability is differentiable with respect to position and separated by boundaries, the potential being a linear combination of one or more basis potentials, with at least one basis function being defined in at least one region as a potential function of at least one or more virtual charge-current sources, the virtual charge-current source being located outside the region.

11. A machine implemented method comprising:
computing, by a machine having a processor system including one or more processors and a memory system, numerical values for a set of parameters that extremize an action integral for a parameterized electromagnetic potential and an electromagnetic field associated with the parameterized electromagnetic potential, the set of parameters, computed by the machine, extremizing an action integral, the action integral being an integral of an electromagnetic Lagrangian;
computing, by the machine, the electromagnetic field based on the set of parameters that extremize the action integral; the computing of the set of parameters including at least solving, by the machine, a set of equations in a plurality of regions within which the polarizability is differentiable with respect to position and separated by boundaries on which the polarizability is not differentiable, the potential being a linear combination of one or more basis potentials, with at least one basis function, being defined in at least one region as a potential function of at least one or more virtual charge-current sources, the virtual charge-current source being located outside the region.

12. A machine implemented method comprising:
computing, by a machine having a processor system including one or more processors and a memory system, numerical values for a set of parameters that extremize an action integral for a parameterized electromagnetic potential and an electromagnetic field associated with the parameterized electromagnetic potential, the set of parameters, computed by the machine, extremizing an action integral, the action integral being an integral of an electromagnetic Lagrangian;
computing, by the machine, the electromagnetic field based on the set of parameters that extremize the action integral;
the computing of the numerical values including at least solving, by the machine, a set of equations in a plurality of regions, the potential being a linear combination of one or more basis potentials, with at least one basis function being defined in at least one region as a potential function of:
at least one virtual charge-current sources, the at least one virtual charge-current source being located outside the region, and
at least on real charged current sources located inside the region.

13. A machine implemented method comprising:
computing, by a machine having a processor system including one or more processors and a memory system, numerical values for a set of parameters that extremize an action integral for a parameterized electromagnetic potential and an electromagnetic field associated with the parameterized electromagnetic potential, the set of parameters, computed by the machine, extremizing an action integral, the action integral being an integral of an electromagnetic Lagrangian;
computing, by the machine, the electromagnetic field based on the set of parameters that extremize the action integral;
solving, by the machine, a set of equations in a plurality of regions including one or more simplices, and
the parameterized potential in one or more simplices satisfying the Euler-Lagrange equations within a tolerance.

14. A machine implemented method comprising:
computing, by a machine having a processor system including one or more processors and a memory system, numerical values for a set of parameters that extremize an action integral for a parameterized electromagnetic potential and an electromagnetic field associated with the parameterized electromagnetic potential, the set of parameters, computed by the machine, extremizing an action integral, the action integral being an integral of an electromagnetic Lagrangian;

computing, by the machine, the electromagnetic field based on the set of parameters that extremize the action integral; wherein the extremizing includes solving, by the machine, a set of equations $$\partial_{c_i} \int \left(\frac{1}{2} F \cdot G - A \cdot J_f\right) du = 0$$

where
∫ indicates to perform an integration,
u is a four dimensional volume having three spatial dimensions and one time dimension over which the integration is performed,
F is an electromagnetic field strength,
A is the electromagnetic potential,
J is free or total charge-current density,
U is the interaction between the field and polarizable media,
$c_i$ are the parameters of the potential A such that $A \approx \Sigma_i a_i c_i$;
and are parameters of the electromagnetic field F such that $F \approx \Sigma_i f_i c_i$
where $a_i$ and $f_i$ are basis functions of A and F, respectively, such that $a_i$ is a function of space-time position, if $a_i$ is not a continuous function of space-time position, any discontinuities present are removable by a gauge transformation,
and $f_i$ is a function of space-time position given by $f_i = \vec{\nabla} a_i$.

15. The machine implemented method of claim 14, wherein the set of equations to be solved, by the machine, is solved while in a form represented by, $$\partial_{c_i} \int \left(\frac{1}{2} F \cdot F - A \cdot J + U\right) du = 0$$

where
$G \approx E_i g_i c_i$ is an electric displacement and magnetic field intensity where
$g_i$ is a linear function of the field $f_i$, and
$J_f$ is free charge-current density.

16. The machine implemented method of claim 15, wherein the set of equations, being solved by the machine, when written as a matrix equation are $$M \cdot C = B$$

for an array C with elements equal to the unknown parameters $c_j$ for $j \neq 0$, where M is a matrix with elements $m_{i,j}$ for indices $i \neq 0$ and $j \neq 0$, and B is an array with elements $b_i$ for indices $i \neq 0$, given in terms of 4D space-time quantities by $$m_{i,j} = \int a_i \cdot (\nabla \cdot g_j) dv + \int a_i \cdot (\eta \cdot \Delta g_j) d\beta$$

$$b_i = -\int a_i \cdot (\nabla \cdot g_0 - J) dv - \int a_i \cdot (\eta \cdot \Delta g_0 - K) d\beta$$

integration over v is performed by a 4D volume integral and integration over β is performed by a 3D boundary integral in 4D space-time.

17. The machine implemented method of claim 16, wherein a media for which the computing is performed is stationary in one inertial reference frame,
time dependence is harmonic at frequency ω, and
the matrix and array elements are computed, by the machine, in terms of 3D space quantities by $$m_{i,j} = \int (\phi_i (\vec{\nabla} \cdot \vec{d}_j) - \vec{a}_i \cdot (\vec{\nabla} \cdot i\omega \vec{d}_j)) dV + \int (\phi_i (\hat{n} \cdot \Delta \vec{d}_j) - \vec{a}_i \cdot (\hat{n} \times \Delta \vec{h}_j)) ds$$

$$b_i = -\int (\phi_i (\vec{\nabla} \cdot \vec{d}_0 - \rho) - \vec{a}_i \cdot (\vec{\nabla} \times \vec{h}_0 + i\omega \vec{d}_0 - \vec{J})) dV - \int (\phi_i (\hat{n} \cdot \Delta \vec{d}_0 - \sigma) - \vec{a}_i \cdot (\hat{n} \times \Delta \vec{h}_0 - \vec{K})) ds$$

in which integration over s is a 2D boundary integral and integration over V is a 3D volume integral; the 3D volume integral may be neglected if the 3D volume integral is equal to zero or less that a predetermined tolerance, in which case the elements are determined by the 2D boundary integrals in 3D space, by $$m_{i,j} = \int (\phi_i (\hat{n} \cdot \Delta \vec{d}_j) - \vec{a}_i \cdot (\hat{n} \times \Delta \vec{h}_j)) ds$$

$$b_i = -\int (\phi_i (\hat{n} \cdot \Delta \vec{d}_0 - \sigma) - \vec{a}_i \cdot (\hat{n} \times \Delta \vec{h}_0 - \vec{K})) ds$$

where
∫ indicates to perform an integration,
$\Phi_i$ is an ith scalar potential basis function
$\hat{n}$ is a unit vector normal to a boundary of computation cell
$\Delta \vec{d}_j$ is a difference between the jth displacement basis function on a first side of the boundary and a jth displacement basis function on a second side of the boundary, the jth displacement basis function on the first side of the boundary being a displacement vector resulting from a jth scalar potential basis function and vector potential basis function on the first side of the boundary, and the jth displacement basis function on the second side of the boundary being a displacement vector resulting from the jth scalar potential basis function and vector potential basis function on the second side of the boundary,
$\vec{a}_i$ is an ith vector potential basis function,
$\Delta \vec{h}_j$ is a difference between a jth magnetic intensity basis function on the first side of the boundary and a jth magnetic intensity basis function on the second side of the boundary,
$\Delta \vec{d}_j$ is a difference between a jth displacement basis function on one side of the boundary and a jth displacement basis function on another side of the boundary, the jth magnetic intensity basis function on the first side of the boundary being a magnetic intensity vector resulting from the jth vector potential basis function on the first side of the boundary, and the jth magnetic intensity basis function on the second side of the boundary being a magnetic intensity vector resulting from the jth vector potential basis function on the second side of the boundary,
dV indicates that the integration is over the volume of the computation region,
ds indicates that the integration is over the boundary of a computation region
$c_j$ are unknown parameters that are being solved for,
$\Delta \vec{d}_0$ is a difference between a 0th displacement basis function on one side of the boundary and a 0th displacement basis function on another side of the boundary, the $0^{th}$ displacement basis function is a displacement function with a coefficient that has a known value, $\Delta \acute{h}_0$ is a difference between a 0th magnetic intensity basis function on one side of the boundary and a 0th magnetic intensity basis function on another side of the boundary, the 0th magnetic intensity basis function is a basis function with a known coefficient, $\acute{K}$, $\rho$, $\vec{J}$, $\sigma$ are the known volume charge density, volume current density, surface charge density on a boundary, and surface current density on a boundary, respectively, and $c_0$ is the coefficient that has a known value.

18. A system comprising:
a processor system having one or more processors; and
a memory system including a one or more non-transitory machine readable media;
the non-transitory machine readable media storing one or more machine instructions, which when implemented by the processor system cause the processor system to perform a method including at least
computing, by the machine, numerical values for a set of parameters of a parameterized electromagnetic potential, by the processor system choosing parameter values that extremize an action integral whose integrand includes at least a Lagrangian density with terms for at least an electromagnetic field, instead of solving Euler-Lagrange equations for the electromagnetic potential in at least part of a region associated with the action integral and instead of solving Euler-Lagrange equations for the electromagnetic fields in at least part of a region associated with the action integral.

19. A non-transitory computer readable medium storing one or more machine instruction, which when implemented by a processor causes the processor to perform a method comprising:
computing, by a machine having a processor system including one or more processors and a memory system, numerical values for a set of parameters of a parameterized electromagnetic potential by the processor system extremizing an action integral within a predetermined tolerance for where the action integral is an integral of an electromagnetic Lagrangian density, the extremizing being performed by the machine at least numerically solving a set of equations for the set of parameters, the set of equations being equations that result from taking partial derivatives of the action integral with respect to the set of parameters.

20. A system comprising a processor system having one or more processors and a memory system storing one or more machine instructions, which when invoked cause the system to implement a method comprising:
computing, by the processor system including one or more processors and a memory system, numerical values for a set of parameters of an action integral; the computing of the numerical values being performed instead of solving Euler-Lagrange equations associated with the action integral in at least part of a region associated with the action integral, the set of parameters being the parameters of an integrand of the action integral,
the set of parameters, computed by the processor system, extremizing an action integral, the action integral being an integral of an electromagnetic Lagrangian; and
computing, by the machine, electromagnetic quantities indicative of electromagnetic behavior of a system characterized by the electromagnetic Lagrangian; the computing of the electromagnetic quantities, being based on the set of parameters that extremize the action integral.

21. A machine implemented method comprising:
computing, by a machine having a processor system including one or more processors and a memory system, numerical values for a set of parameters of an integrand of an action integral, instead of solving Euler-Lagrange equations associated with the action integral in at least part of a region associated with the action integral,
the numerical values computed by the machine for the set of parameters extremizing the action integral, and the action integral being an integral of an electromagnetic Lagrangian; and
computing, by the machine, electromagnetic quantities indicative of electromagnetic behavior of a system characterized by the electromagnetic Lagrangian; the computing of the electromagnetic quantities, being based on the set of parameters that extremize the action integral.

22. A system comprising a processor system having one or more processors and a memory system storing one or more machine instructions, which when invoked cause the system to implement a method comprising:
computing, by a machine having a processor system including one or more processors and a memory system, numerical values for a set of parameters that are coefficients of basis functions of an integrand of an action integral, the numerical values being computed from values of one or more integrals that are part of the action integral;
the numerical values computed by the machine for the set of parameters extremize the action integral, and the action integral being an integral of an electromagnetic Lagrangian; and
computing, by the machine, electromagnetic quantities indicative of electromagnetic behavior of a system characterized by the electromagnetic Lagrangian; the computing of the electromagnetic quantities, being based on the set of parameters that extremize the action integral.

23. The system of claim 22, wherein the set of parameters being coefficients of basis functions associated with the integrand.

24. A machine implemented method comprising:
computing, by a machine having a processor system including one or more processors and a memory system, numerical values for a set of parameters of an integrand of an action integral, the numerical values being computed from values of one or more integrals that are part of the action integral;
the numerical values computed by the machine for the set of parameters extremizing the action integral, and the action integral being an integral of an electromagnetic Lagrangian; and
computing, by the machine, electromagnetic quantities indicative of electromagnetic behavior of a system characterized by the electromagnetic Lagrangian; the computing of the electromagnetic quantities, being based on the set of parameters that extremize the action integral.

25. The method of claim 24, wherein the set of parameters are coefficients of basis functions associated with the integrand.

26. The method of claim 24, further comprising:
computing, by the machine, components of a potential, and calculating, by the machine, a normal directional derivative of the potential at boundary points enclosing a computational region with uniform polarizability, based on boundary conditions of only tangential components of the potential.

27. The method of claim 26, further comprising:
computing, by a machine, an electromagnetic field at boundary points of the computational region, based on the components of the potential and the normal directional derivative of the potential; and
evaluating boundary integrals needed to extremize the action, the boundary integrals being integrals that make up portions of the action integral in which integration is performed in a region including boundaries between computation regions.

28. The method of claim 27, further comprising evaluating the boundary integrals by determining basis function $g_\alpha$ of the electromagnetic field on each side of the boundaries of the computational region.

29. The method of claim 24, further comprising: determining potential basis function $a_\alpha$ based on at least requiring that the potential basis function $a_\alpha$ satisfy the Euler-Lagrange equation at non-boundary points and the media Lorenz condition, and therein requiring the potential to satisfy a media wave equation, at non-boundary points.

30. The method of claim 29, further comprising:
determining, by the machine, values of parameters ca for potential basis functions $a_\alpha$ by at least determining tangential components of potential basis functions $a_\alpha$ at the boundary points and by requiring that potential basis functions $a_\alpha$ satisfy a Lorenz condition and a wave equation at the boundary points, such that variation with respect to the parameters of boundary integrals of the action integral are zero.

31. The method of claim 29, further comprising:
varying, by the machine, numerical values of coefficients $c_\alpha$ of the potential basis function $a_\alpha$ of a total potential $A=a_\alpha c_\alpha$ to extremize the boundary integrals of the action integral, where $a_\alpha$ and $c_\alpha$ are summed over indices a, and each index value of a corresponds to a different potential basis function $a_\alpha$; and
determining, by the machine, values of electromagnetic field basis function $g_\alpha$ on each side of the boundaries at the boundary points;
wherein a normal component of a space-time vector potential a and the normal directional derivatives of components of the space-time vector potential a at the boundary points are determined, based on the tangential components of the space-time vector potential a, for a space-time vector potential that satisfies the Euler-Lagrange equation and the Lorenz media condition.

32. The method of claim 31, further comprising:
the determining of the values of electromagnetic field basis function $g_\alpha$ including at least computing, by the machine, the field basis functions $g_\alpha$ as a linear combinations of space-time vector potential basis functions $a_\alpha$.

33. The method of claim 24, further comprising
based on representing, a media as connected computational regions,
determining surface unit vectors, $n_s$, that are normal to surfaces of the computational regions;
at vertices v of the computational regions, determining, by the machine, vertex unit vectors, $n_v$, the vertex unit vectors being normal to the surfaces of computational region, the determining of the vertex unit vectors including at least averaging, via a weighted average of the surface unit vectors of the computational region that are associated with surfaces of the computational region that are joined at that vertex;
defining, by the machine, potential parameters, having 7 degrees of freedom per vertex,
the potential parameters include values of a space-time vector potential $a_v \equiv a[r_v]$ at vertex v, where v is an index having one value for each vertex and r is a position vector of vertex v, a is the space-time vector potential, the space-time vector potential $a_v$ at position $r_v$ has 4 components that make up 4 degrees of freedom of the 7 degrees of freedom per vertex, and
the potential parameters include values of the derivatives in a direction of unit vertex vector $n_v$ of the components of a that are perpendicular to $n_v$, which, using geometric algebra notation, are $\partial_v a_{vv} \equiv (n_v \cdot \nabla)(n_v \hat{n}_v a[r_v])$, values of the derivatives in the direction of the unit vertex vector $n_v$ of the components of a that are perpendicular to $n_v$, which include 3 degrees of freedom per vertex that make up 3 degrees of freedom of the 7 degrees of freedom per vertex, and;
wherein the tangential components of the potential are continuous across the boundary of computational region; and
wherein the directional derivatives are not required to be continuous across the boundary of the computational region.

34. The method of claim 33, further comprising:
determining the space-time vector potential a at points on the boundary on a computational region as a linear function of position, such that values of the space-time vector potential a at positions $r_v$ are given by the space-time vector potential $a_v$ at vertex v.

35. The method of claim 24,
based on representing, a media as connected computational regions,
determining surface unit vectors, $n_s$, that are normal to surfaces of the computational regions;
at vertices v of the computational regions, determining, by the machine, vertex unit vectors, $n_v$, the vertex unit vectors being normal to the surfaces of computational region, the determining of the vertex unit vectors including at least averaging, via a weighted average of the surface unit vectors of the computational region that are associated with surfaces of the computational region that are joined at that vertex;
defining, by the machine, potential parameters, having 7 degrees of freedom per vertex,
the potential parameters include values of a space-time vector potential $a_v \equiv a[r_v]$ at vertex v, where v is an index having one value for each vertex and r, is a position vector of vertex v, a is the space-time vector potential, the space-time vector potential a at positions $r_v$ has 4 components that make up 4 degrees of freedom of the 7 degrees of freedom per vertex, and
the potential parameters include values of the derivatives in a direction of unit vertex vector $n_v$ of the components of a that are perpendicular to $n_v$, which, using geometric algebra notation, are $\partial_m a_{vv} \equiv (n_v \cdot \nabla_m)(n_v \hat{n}_v a_m[r_v])$, which include 3 degrees of freedom per vertex that make up 3 degrees of freedom of the 7 degrees of freedom per vertex, wherein is used as a subscript to indicate that parameters characterizing the media replace parameters characterizing a vacuum and where $a_m$ is a linear function of the space-time vector potential $a_v$ at position $r_v$ and satisfies an equation similar to that for a except that parameters characterizing a vacuum are replaced by parameters characterizing the media; and
wherein the tangential components of the potential are continuous across the boundary of computational region; and wherein the normal components of the potential and the directional derivatives in the normal direction are not required to be continuous across the boundary of the computational region.

36. The method of claim 35, further comprising;
determining by the machine, values characterizing $(n_v \cdot \nabla_m)(n_v v_v \cdot a_m)$ on each side of the boundaries in terms of the values of $n_v \hat{n}_v a_m$, based on a media Lorenz condition on the boundary, leaving 7 of 8 degrees of freedom still to be determined; and
determining by the machine, values characterizing the 3 degrees of freedom associated with $(n_v \cdot \nabla_m)(n_v \hat{n}_v a_m)$ and the 1 degree of freedom associated with $(n_v n_v \cdot a_m)$ on each side of the boundaries at each vertex of the computational cell in terms of the remaining 3 degrees of freedom associated with $n_v \hat{n}_v a_v$, by requiring that Green's 3rd Identity is satisfied at each of the vertices on both sides of boundaries, leaving these 3 remaining degrees of freedom to be chosen to extremize the action.

37. The method of claim 33, further comprising:
for each vertex on each side of the boundary, determining, by the machine, 4 of the 7 degrees of freedom of the space-time vector potential $a_v$ and the normal derivative of tangential components of the space-time vector potential $a_v$, $n_v \cdot n_v \hat{n}_v a_v$, at each vertex $r_v$, by at least:
computing, by the machine, the values of the remaining 3 degrees of freedom associated with $n_v \hat{n}_v a_v$ at each vertex by using the set of space-time vector valued equations $$a[\vec{r}'] = \int_{\partial V} (\psi[\vec{r}-\vec{r}']\vec{n}\cdot\vec{\nabla}a[r] - \vec{n}\cdot\vec{\nabla}\psi[\vec{r}-\vec{r}']a[\vec{r}])d^2r + \int_V j_f[\vec{r}]\psi[\vec{r}-\vec{r}']dV$$

at all boundary vertices r' as constraints, where $\psi[\vec{r}]$ is a Green's function for the wave equation satisfied by potential a, $$\psi[\vec{r}] = \frac{-1}{4\pi|\vec{r}|}e^{ik|\vec{r}|}.$$

38. The method of claim 37 further comprising:
solving space-time vector equations having 4 degrees of constraint per vertex as a matrix equation for 3 derivative parameters $n_v \cdot \nabla n_v \hat{n}_v a[\vec{r}_v]$ per vertex and 1 component $n_v \cdot a_v$ per vertex of the space-time vector potential $a_v$ at positions $r_v$ that is normal to the boundary and that has a linear dependence on 3 parameters $n_v \hat{n}_v a_v$ per vertex, resulting in solving a matrix equation containing a 4V×3V matrix times a 3V column vector representing the final degrees of freedom, a 4V×4V matrix times a 4V column vector representing the 4V degrees of freedom to be solved for in terms of the final degrees of freedom, and a 4V column vector representing the integral over the charged current source j, where V is the number of vertices, with the solution giving the 4V parameters $n_v \cdot \nabla n_v \hat{n}_v a[\vec{r}_v]$ and $n_v \cdot a_v$, on a side of the boundary that touches a region to which Green's theorem was applied, as linear functions of the 3V parameters $n_v \hat{n}_v a_v$.

39. The method of claim 38, further comprising: determining, by the machine, based on the 7V parameters, and the Lorenz or media Lorenz condition, the potential and the potential's normal derivative at any point on the boundary on a side of the boundary being analyzed.

40. The method of claim 39, further comprising: determining basis function $a_i$ by at least setting one component of the vertex parameter $n_v \hat{n}_v a_v$ at one vertex equal to unity, and other vertex parameters and a source $j_f$ to zero.

41. The method of claim 40, further comprising: determining basis function $a_0$ for all four components of the space-time vector potential a by at least setting vertex parameters to equal a value and setting the source $j_f$ to equal a specified source $J_{f,}$ or $J_m$ if using media quantities, of the simulation;
wherein there are then 3V basis functions $a_i$ and associated coefficients c one corresponding to each of the 3V parameters $n_v \hat{n}_v a_v$.

42. The method of claim 41, further comprising:
inverting, by the machine, the matrix, therein forming an inverted matrix, and forming an 8V×3v matrix from the inverted matrix and an expression of the Lorenz condition, giving the 8V parameters;
evaluating, by the machine, based on the 8 v parameters, the potential $A[\vec{r}]$ at the boundary points, and the electromagnetic field $F=\hat{\nabla}A[\vec{r}]$ approaching the boundary point r on either side of the boundary, as linear functions of the 3V basis function coefficients $c_i$ and of position on each boundary of the computational cell.

43. The method of claim 35, further comprising:
determining an electric displacement and magnetic intensity field G as a linear function of an electromagnetic field F;
numerically evaluate the boundary integrals needed to find coefficients $c_i$ that extremize the action, and numerically solve for the coefficients $c_j$, based on a potential A and the potential's normal derivatives at all boundary points, as either a basis potential or the potential that extremizes the action, calculating the potential $A[\vec{r}]$, where the potential A is a function of the coefficients $c_i$ and basis functions;
calculating the electromagnetic field $F=\hat{\nabla}A$ and the electric intensity and magnetic displacement G[F] at any point based on Green's 3rd Identity.

44. The method of claim 35, determining, by the machine, the electromagnetic field F at a point r' in a region with uniform polarizability, based on an equation, $$F[\vec{r}']=\int_{\partial V}\Psi[\vec{r}-\vec{r}']d\vec{n}F[\vec{r}]-\int_V\Psi[\vec{r}-\vec{r}']\gamma_0 j[\vec{r}]dV,$$

where F is an electromagnetic field satisfying, $F=\hat{\nabla}A$ and obtained on the boundary $\partial V$ from the potential A found by extremizing the action,
where $\Psi$ is a Green's function, where n is a unit vector,
$j[\vec{r}]$ is a charge current source, and $\gamma_0$ is a future pointing time-like unit vector.

45. The method of claim 44, and the Green's function $\Psi$ is given by $$\Psi[\vec{r}]=(-ik+\nabla)\psi[\vec{r}]$$

where k is a wave number, given by $k\equiv\omega/c$ and where is an angular frequency and c is a speed of light.

* * * * *